United States Patent
Moreau et al.

(10) Patent No.: US 10,366,400 B2
(45) Date of Patent: Jul. 30, 2019

(54) REDUCING UN-SUBSCRIPTION RATES FOR ELECTRONIC MARKETING COMMUNICATIONS

(71) Applicants: Adobe Systems Incorporated, San Jose, CA (US); Neolane SAS, Arcueil (FR)

(72) Inventors: Stéphane Moreau, L'Hay les Roses (FR); Sachin Soni, New Dehli (IN); Ashish Duggal, Delhi (IN); Anmol Dhawan, Ghaziabad (IN)

(73) Assignee: Adobe Inc., San Jose, CA (US)

( * ) Notice: Subject to any disclaimer, the term of this patent is extended or adjusted under 35 U.S.C. 154(b) by 880 days.

(21) Appl. No.: 14/797,806

(22) Filed: Jul. 13, 2015

(65) Prior Publication Data
US 2017/0017971 A1 Jan. 19, 2017

(51) Int. Cl.
*G06Q 30/02* (2012.01)

(52) U.S. Cl.
CPC ..... *G06Q 30/0202* (2013.01); *G06Q 30/0255* (2013.01); *G06Q 30/0258* (2013.01)

(58) Field of Classification Search
CPC ........... G06Q 30/0202; G06Q 30/0255; G06Q 30/0258; G06Q 30/0244; G06Q 30/0242; G06Q 30/0201; G06Q 30/0272; H04M 14/853
See application file for complete search history.

(56) References Cited

U.S. PATENT DOCUMENTS

| 5,822,410 A * | 10/1998 | McCausland ......... H04M 15/00 379/114.01 |
| 6,301,471 B1 * | 10/2001 | Dahm ................... H04M 15/00 379/114.1 |
| 2003/0200135 A1 * | 10/2003 | Wright ................... G06Q 30/02 705/7.29 |

(Continued)

OTHER PUBLICATIONS

Non-Patent Literature Search of Google Patents, dated Feb. 21, 2019.*

(Continued)

*Primary Examiner* — Tyler W Knox
(74) *Attorney, Agent, or Firm* — Kilpatrick Townsend & Stockton LLP

(57) ABSTRACT

Methods score users to determine if they will receive marketing communications sent to users on a subscription list. One method calculates an un-subscription score for a user based on: a degree of sentiment determined by identifying user interaction with a web page and assessing content of the interaction for indications of sentiment; or a degree of sentiment determined by identifying a user communication and assessing its content for indications of sentiment. Responsive to determining that the un-subscription score exceeds a threshold, the method excludes the user when sending the marketing communication to users on the subscription list. Another method calculates a degree of sentiment based on user interactions with a page and user communications, and calculates the user's un-subscription score based on the degree of sentiment. Responsive to (Continued)

comparing the un-subscription score with a threshold, the method excludes the user when sending the marketing communication to users on the list.

20 Claims, 9 Drawing Sheets

(56) References Cited

U.S. PATENT DOCUMENTS

| | | | | |
|---|---|---|---|---|
| 2009/0307771 A1* | 12/2009 | Rajan | ............... | G06Q 10/107 726/22 |
| 2011/0053618 A1* | 3/2011 | Lin | ............... | H04L 51/12 455/466 |
| 2012/0028606 A1* | 2/2012 | Bobotek | ............... | H04L 51/12 455/411 |
| 2013/0018964 A1* | 1/2013 | Osipkov | ............... | G06Q 10/107 709/206 |
| 2014/0115067 A1* | 4/2014 | Rosenwald | ............... | G06Q 10/107 709/206 |
| 2014/0314215 A1* | 10/2014 | Duva | ............... | G06Q 30/0202 379/88.01 |
| 2015/0071427 A1* | 3/2015 | Kelley | ............... | G06Q 30/0202 379/265.09 |
| 2015/0256499 A1* | 9/2015 | Kumar | ............... | G06F 16/958 709/206 |
| 2016/0036887 A1* | 2/2016 | Ilic | ............... | H04L 51/32 709/206 |

OTHER PUBLICATIONS

Non-Patent Literature Search of Google Scholar, dated Feb. 21, 2019.*

Moumita Sinha; "Predicting Unsubscription of Potential Customers" U.S. Appl. No. 14/614,252, filed Feb. 4, 2015.

* cited by examiner

| Issues | Number of customers who un-subscribed from the marketing communications (e.g., selected an unsubscribe link in a promotional email) | Number of customers who did not un-subscribe from the communications | Probability of unsubscribing |
|---|---|---|---|
| Un-answered query/question | 12500 | 1360 | 90% |
| Dissatisfied with feature of product (e.g., camera) | 1400 | 440 | 76% |
| Dissatisfied with other feature of product (e.g., display) | 520 | 130 | 80% |
| Dissatisfied with service (e.g., late delivery of product) | 340 | 180 | 65% |

REDUCING UN-SUBSCRIPTION RATES FOR ELECTRONIC MARKETING COMMUNICATIONS

TECHNICAL FIELD

The present disclosure generally relates to communications for marketing campaigns (e.g., electronic marketing communications), and more specifically relates to systems and methods for reducing un-subscription rates for marketing campaign communications.

BACKGROUND

Companies and other organizations seek to market their products and services to consumers as effectively as they can. For example, marketers want to remain connected with their customers via email and do not want their customers to unsubscribe to their email distribution lists. In order to reduce an 'unsubscribe rate,' marketers and brands typically need to perform resource intensive tasks to address multiple factors before sending an email to a customer. One such factor is determining an optimum frequency of promotional emails. If too many promotional emails are sent within a given period, customers may unsubscribe from emails associated with a brand or product. Another factor is personalization. Customers may unsubscribe from an email list in response to receiving impersonal, generic emails. As a result, marketers currently spend many resources to personalize emails for a recipient (e.g., personalizing the subject or content of an email message for a particular recipient).

Current marketing programs can fall victim to the issue of high un-subscription rates. One issue with traditional marketing programs is that marketing becomes difficult when existing customers of a product or brand start unsubscribing or opting out of receiving email associated with the product or brand. This is because attracting new customers can cost a company much more (e.g., five times more) than keeping an existing customer. Also, the probability of selling to an existing customer is much higher than the probability of selling to a new prospect or lead. Thus, marketers and entities associated with products and brands (e.g., manufacturers and suppliers) do not want an email campaign to result in their existing customers un-subscribing from their email lists. Hence, reducing un-subscriptions rates is very important to the marketers and entities.

Existing techniques seek to predict a response of a potential customer (e.g., a prospective customer) to receiving an electronic message from a marketer. These techniques can use a prediction un-subscription model to determine if a prospect or lead is prone to disengage from an electronic marketing campaign based on receiving an electronic message from the marketer. The techniques attempt to predict whether a potential customer will disengage from an electronic marketing campaign by identifying features and interactions associated with the potential customer and determining whether the features and interactions indicate that the potential customer is prone to disengage from receiving further electronic messages from the marketer. In one such technique, the prediction un-subscription model may indicate a likelihood that the prospect will disengage from an electronic marketing campaign responsive to receiving an electronic marketing communication, and the model can indicate a timing when the electronic communication is unlikely lead to disengagement by the prospective customer. These existing techniques do not address un-subscription rates for current customers.

Marketers and salespeople do not want to send marketing communications that may cause an existing customer to unsubscribe (e.g., opt out of receiving future communications from the marketer). Thus, there is a need for systems that enable marketers to reduce un-subscription rates among customers. Existing techniques for reducing un-subscription rates for marketing communications are limited because these techniques do not take into account intelligence related to real time information about the context, sentiment and interaction that a customer has in relation to the marketer's product and services.

SUMMARY

Systems and methods are disclosed for reducing un-subscription rates for electronic marketing communications (e.g., outbound messages to customers such as emails). Embodiments calculate the probability that a given consumer (e.g., a customer in an email list) will unsubscribe from marketing communications and avoid sending marketing communications to customers whose probability of un-subscribing exceeds a certain threshold. In some embodiments, an un-subscription score for a customer is based on tracked actions or issues associated with the customer. The tracked actions and issues can contribute a customer's sentiment towards a product (or features of the product). For example, marketing communications associated with the product may only be sent after identifying which customers have positive sentiment towards the product, which corresponds to relatively low probabilities of un-subscription. That is, a probability of un-subscription can be relatively low based on a customer's positive sentiment associated with the product.

One disclosed method scores a user to determine whether the user will receive electronic marketing communications sent to users on a subscription list. The method calculates an un-subscription score for the user based at least in part on: a degree of sentiment determined based on identifying an interaction by the user with a web page and automatically assessing content of the interaction for indications of sentiment; or a degree of sentiment determined based on identifying an electronic communication from the user and automatically assessing content of the electronic communication for indications of sentiment. The method then compares the calculated un-subscription score with a threshold un-subscription score. In response to determining, based on the comparison, that the calculated un-subscription score is above a threshold un-subscription score, the method excludes the user when sending the electronic marketing communication to users on the subscription list.

Another disclosed method scores a user to determine whether the user will receive an electronic marketing communication sent to users on a subscription list. The method includes calculating, by a sentiment engine configured to determine sentiments, a degree of sentiment based on user interactions with a web page associated with a product. The method then uses the sentiment engine to calculate a degree of sentiment based on electronic user communications associated with the product. The method also includes calculating the user's un-subscription score based at least in part on the degree of sentiment based on user interactions with the web page and the degree of sentiment based on the electronic user communications associated with the product. Responsive to comparing the calculated un-subscription score with a threshold un-subscription score, the method excludes the user when sending the electronic marketing communication to users on the subscription list.

These illustrative embodiments are mentioned not to limit or define the invention, but rather to provide an example to aid understanding thereof. Illustrative embodiments are discussed in the Detailed Description, which provides further description of the invention. Advantages offered by various embodiments of this invention may be further understood by examining this specification.

BRIEF DESCRIPTION OF THE FIGURES

These and other features, aspects, and advantages of the present disclosure are better understood when the following Detailed Description is read with reference to the accompanying drawings, where:

FIG. 6 shows calculated probabilities of customers unsubscribing from marketing communications based on user issues, in accordance with embodiments;

FIG. 7 shows keywords and sentiments extracted from an example user communication, in accordance with embodiments;

DETAILED DESCRIPTION

Figure 1:
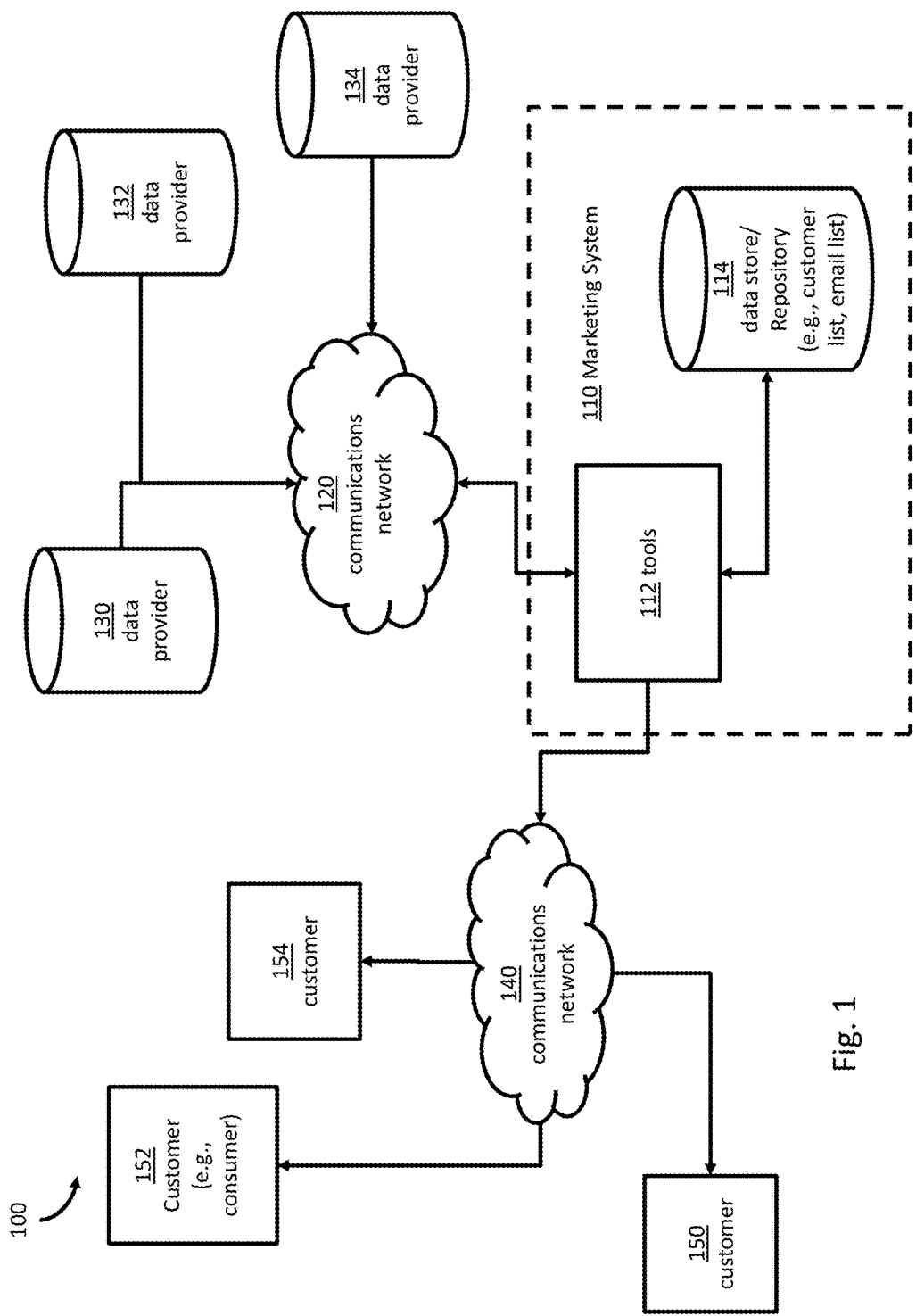
FIGS. 1-3 show systems for reducing un-subscription rates for marketing communications, in accordance with embodiments.

Example embodiments are described herein in the context of systems and methods for reducing un-subscription rates for electronic marketing communications. Electronic marketing communications include electronic communications such as email messages sent to consumers of products or services of a business (e.g., customers of an online retailer). Embodiments solve problems with traditional marketing tools that do not take into account the likelihood of a customer un-subscribing to marketing communications before sending a marketing communication to the customer. By employing the disclosed techniques that consider the sentiment a customer has towards a product, and using that sentiment to determine a probability that the customer will unsubscribe from marketing communications associated with the product, a marketer can avoid sending marketing communications to customers who are likely to unsubscribe to marketing communications. For example, a customer can be scored as someone who is likely to unsubscribe if the customer has posted negative reviews regarding the marketer's product on a web site.

The systems and methods automatically filter out customers who have a probability of un-subscribing to marketing communications that exceeds a certain threshold (e.g., a high un-subscription score). In some embodiments, the threshold can be specified by a marketer as a maximum un-subscription score or a maximum un-subscription probability percentage. By filtering out customers whose probabilities of un-subscribing are above the threshold, the systems and methods prevent marketing communications from being sent to customers who are likely to unsubscribe.

The filtering can temporarily disable transmission of marketing communications to customers until their respective un-subscription probabilities are below the threshold. Such filtering can improve the efficiency of a marketing system by reducing the workload of a communications component (e.g., an email server). In addition to reducing the workload of a communications component, embodiments further improve the operation of a marketing system by reducing the need to process un-subscription requests submitted by customers. That is, by avoiding sending a marketing communication to customers who are likely to submit an unsubscribe request as a result of receiving the marketing communication, the marketing system will have less unsubscribe requests to process.

The systems and methods automatically identify the types of issues (e.g., service related issues, un-answered requests or queries related to product features, negative sentiment related to features etc.) that are resulting in higher rates of un-subscription among customers. The systems and methods provide a sorted list of these issues to a marketer so that they can be addressed so as to reduce future un-subscriptions.

Embodiments determine if a customer is facing a service related issue or is dissatisfied with a product. Such a customer will usually have a higher probability of unsubscribing from marketing communications for the product or product brand if the customer receives a new promotional communication while the customer's service related request is still pending. For instance, such a customer may be more likely to request to be removed from an email list in response to being sent a promotional email about the product. Embodiments enable a marketer to use a marketing system, such as, for example, Adobe® Campaign®, to automatically determine what types of issues (e.g., complaints and service related issues) are resulting in higher un-subscription rates. For example, embodiments can determine that a customer who is dissatisfied with a camera feature of a mobile phone has a higher chance of un-subscribing to marketing emails for the phone as compared to a customer who is dissatisfied with the phone's battery.

The following section provides examples of customer issues leading to dissatisfaction with a product and actions a marketer may want to take in such situations. As a first example, if a customer posts a negative comment about a mobile phone product via email or on the site of the phone supplier about a recent purchase of the phone, an embodiment infers that this customer is dissatisfied with the performance of the phone. The phone supplier can be any entity that provided the phone to the customer. For example, the phone supplier can be a wireless carrier, the phone's manufacturer, a marketer, a consumer electronics retailer, or an online seller. In this case, a marketing system, such as, for example, Adobe® Campaign®, can determine if this issue is critical enough that e-retailer should temporarily cease sending promotional emails to the customer until someone has contacted the customer or answered the customer's posting to address the issue.

As a second example, if a customer posts a query via email or on the web site of an e-retailer about a recent purchase of a mobile phone, but the query has still not been answered, embodiments determine if the query should be answered prior to sending future marketing communications to the customer. In this example, a marketing system can figure out if this issue (i.e., an unanswered customer query) is critical enough that the e-retailer should temporarily stop sending promotional emails for products until someone has contacted or answered the post of this customer.

In a third example, if a customer fills out a survey sent via email, and requests in the survey, a demonstration of a product, an embodiment can determine that the requested demonstration has not yet been provided. This example can arise due to a product supplier's resource constraints. For instance, this scenario may be due a large number of customers requesting product demonstrations when a supplier such as a retailer does not have a sufficient supply of the product, or enough available staff to fulfill the requests. This results in some customers not being contacted regarding their requested product demonstration. According to this example, a marketing system can determine if this situation is critical enough so that the supplier should stop sending promotional communications regarding the supplier's products until someone has demonstrated the product to this customer.

In another example, issues of customer dissatisfaction may arise due to service related issues on the part of the product supplier. Such issues can include, for example, payment processing issues, late delivery of a product, and product warranty issues (delayed product repairs, lack of replacement parts, etc.). For example, embodiments can inform a supplier that while the average delivery time for a product to San Francisco area customers is 3-5 days, it took more than 10 days to deliver the product to a particular subset of customers. A marketing system, such as, for example, Adobe® Campaign®, can figure out if such customers with late delivery issues are highly likely to unsubscribe from the supplier's marketing communications (e.g., opt to be removed from the supplier's email list).

In an embodiment, a marketing system includes a user interface for defining enhanced topology rules. The user interface allows a marketer to set topology rules and delivery preferences for marketing communications such as emails. The interface can provide a selectable option to a marketer to indicate that communications are not to be sent to customers whose probability of un-subscribing exceeds a marketer defined threshold. An embodiment can also provide the marketer with suggestions of top activities or issues are leading to un-subscriptions so that these issues can be addressed by the marketer so as to prevent future un-subscriptions related to the issues.

Figure 5:
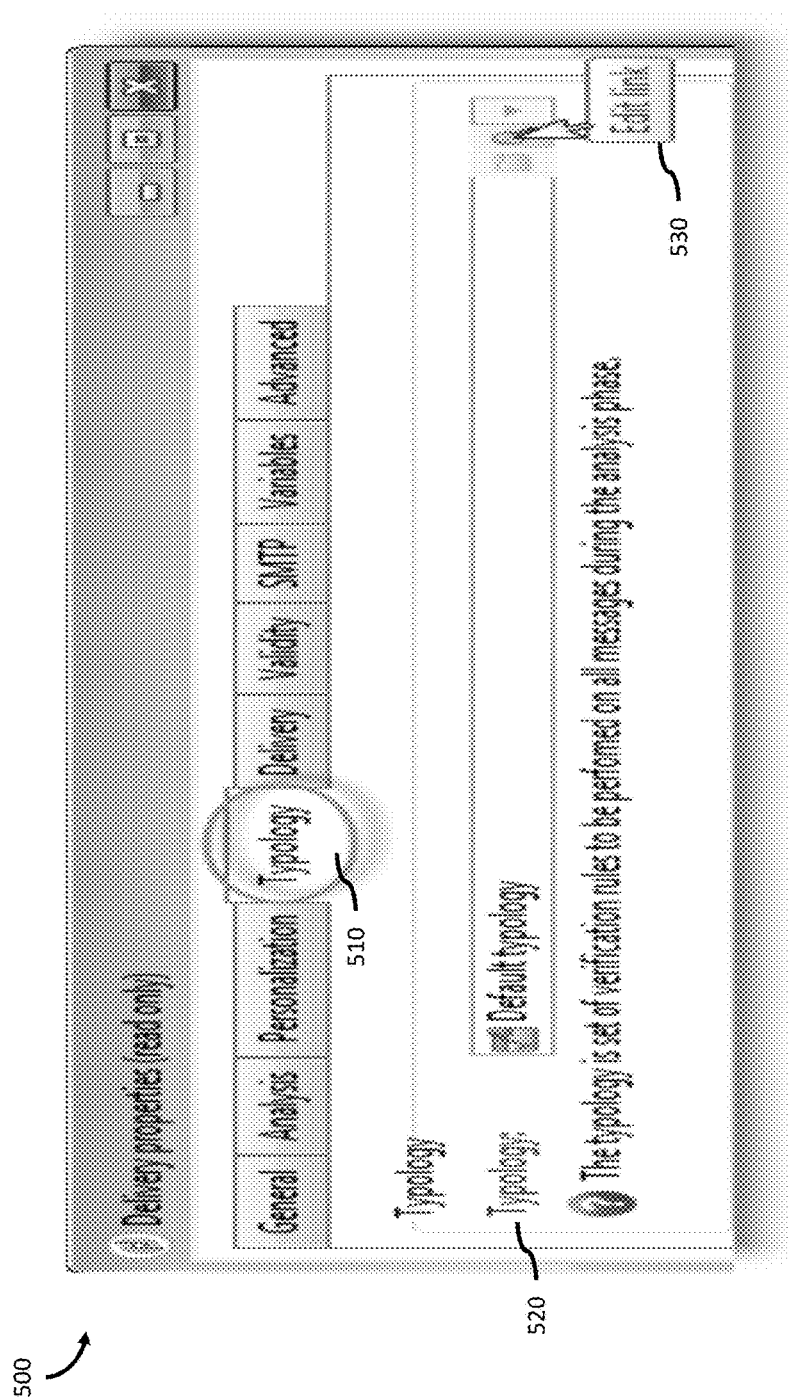
FIG. 5 shows a user interface for setting typology rules for marketing communications, in accordance with embodiments.

Example methods and systems for reducing un-subscription rates include the following steps and components. A communications delivery preference 'P' is set for marketing communications, where P indicates that marketing communications are not to be sent to customers having high un-subscription probabilities. The selection of P can be received as marketer input in a typology interface. As used herein, a typology refers to a set of verification rules to be performed on communications (e.g., messages) during an analysis phase. The analysis phase determines, based on the typology rules, whether a marketing communication is to be sent to a customer. The typology interface can be part of a marketing system. An example typology interface is depicted in FIG. 5. In one example, a marketing system such as Adobe® Campaign® can display the typology interface. The preference P can be selected by a marketer in order to specify an un-subscription score or probability threshold 'T'. Threshold T is a marketer specified threshold and can be expressed as a percentage. By selecting P in a typology rules interface, a marketer can filter out customers (e.g., members of a subscription list such as an email list) whose probability of un-subscription is greater than the marketer specified threshold T. That is, when preference P is selected and threshold T is set, marketing communications will not be sent to customers whose probability of unsubscribing from marketing communications (e.g., un-subscription score) is greater than T. In one non-limiting example, a default value of 'T' is 80%.

After the marketer selects the preference P and sets threshold T, the method initializes a set of customer activities 'A' to be tracked. The probability of un-subscription can be calculated based on customer activities and issues. The set of activities or issues 'A' can be defined and tracked by a marketing system, such as, for example, Adobe® Campaign®. Example activities in set A can include, but are not limited to: no follow-up after a customer fills out a product-related survey; late delivery of the product in the past; payment processing issues; late delivery of a product; issues related to specific product features, and product warranty issues.

Then, for every feature 'F_i' in a set of features 'F' corresponding to marketer's product, the following items are determined. The set of features F can either be specified by the marketer or can be automatically determined by passing content of the marketer's product page through a natural language processing (NLP) engine such as Adobe® Sedona or the Natural Language Toolkit (NLTK). It is also determined if there is any query related to the feature un-answered in the content of a communication or posting sent by customer in the past. For each feature F_i, it is also determined if there is any query related to the feature un-answered in the content of the post made by the customer on the marketer's site or on a social media page (e.g., Facebook®) associated with product or the product's brand. Any negative sentiment of a feature F_i in the content of an email sent by a customer is also determined. For each feature F_i, it is also determined if there is any negative sentiment in a posting created by a customer on the marketer's site or on the social media page associated with product or brand. In alternative or additional embodiments, the marketer can define other customer activities and issues that should be tracked and analyzed.

Next, the method determines how many customers previously unsubscribed from marketing communications. For example, for a previous marketing email sent to 'N' users, out of which 'U' number of users unsubscribed from the email, and 'R' number of users did not unsubscribe, $R=N-U$. The users can be customers or consumers of a product or service. Then, for every activity 'A_i' in set A, the method determines a probability 'P_A_i' of a customer un-subscribing from a marketing communication as follows: find the number 'U_A_i' of users in U that exhibited activity A_i; and find the number 'R_A_i' of users in R that exhibited activity A_i. For activities such as no follow up after a survey, late delivery of the product etc., determining probability P_A_i can be computed using the information stored by the marketing system. For other activities such as an un-answered query related to a particular feature, the content of the communications or post sent/posted by the customer can be passed through a natural language processing engine to determine if the content mentions that specific feature.

For negative sentiment corresponding to a particular feature, the content of the communications or post sent or posted by the customer can be passed through a keyword level sentiment engine to determine if there is any negative sentiment associated with that feature.

According to an embodiment, a percentage probability P_A_i can be computed as follows: $P\_A\_i = U\_A\_i/(U\_A\_i + R\_A\_i)*100$ Then, for every customer 'U_i', the method determines the probability 'P_U_i' of un-subscribing. If the probability P_U_i is greater than the marketer specified threshold T, that customer is excluded from the set of customers to whom marketing communications for a campaign should be sent. $P\_U\_i$ can be computed as follows:

initialize $P\_U\_i=0$
    For every activity $A\_i$ in A
    If activity $A\_i$ is exhibited by user $U\_i$ $P\_U\_i=P\_U\_i+P\_A\_i$ If $P\_U\_i>T$, exclude customer $U\_i$ from the set of customers to whom campaign communications should be sent.

Next, activities in A can be sorted on the basis of their probabilities of unsubscribing and the sorted list can be provided to the marketer. This sorted list corresponds to the top reasons of customers un-subscribing, so these reasons can be taken care of by the marketer so as to prevent further un-subscriptions related to those activities.

When a customer makes a comment on the marketer's product page or sends an electronic communication (e.g., an inbound communication such as an email) to the marketer, an embodiment analyzes this communication as follows. A NLP engine is trained using a dictionary that is product/domain-specific and that includes service-related keywords. This is done in order to determine: whether the product name is mentioned in the customer communication; the product features mentioned in product documentation; and any other service-related features or issues (e.g., product delivery issues and payment issues) mentioned in the customer's communication.

At this point, keyword-level sentiment analysis is performed on the communication in order to determine the sentiment of the customer towards the product, its features, and any service related issues mentioned in the communication. The results of the sentiment analysis are stored in a master marketing profile of the customer. If a customer communication does not contain any product names, feature names, or service related features, then instead of using a keyword level sentiment engine, one embodiment can use a generic sentiment engine to find the overall sentiment of the communication.

Next, for every activity being tracked by the marketing system, the probability of a customer unsubscribing from communications corresponding to that activity will be predicted. This prediction is made by comparing the numbers of customers who exhibited the tracked activity and then unsubscribed from marketing communications to the numbers of customers who did not unsubscribe from the communications and exhibited the same tracked activity.

Then, for each customer, an overall probability of un-subscription can be determined on the basis of activities that the customer exhibits and the corresponding probabilities of those activities leading to an un-subscription by the customer. If an overall probability of un-subscription for a customer is greater than a marketer specified threshold (e.g., 80%), this customer would be excluded from the list of customer to whom marketing communications should be sent. The customer activities can be sorted on the basis of their respective probabilities of un-subscribing, and the sorted list can be provided to the marketer. This sorted list will correspond to the top reasons of customers un-subscribing. These ranked reasons can then be addressed by the marketer so as to prevent further un-subscriptions related to those activities.

Embodiments use natural language processing part of speech (POS) tagging to identify important service related keywords or features of recently purchased products mentioned by a customer in a comment or email communication sent to the marketer. One such embodiment uses a statistical auto-tagger/summarizer provided by a text/content analysis engine, such as, for example, Adobe® Sedona. Another embodiment uses POS tagging provided by the Natural Language Toolkit (NLTK) for the same purpose. Embodiments can use a variety of dictionaries, such as, for example, one or more of a standard WordNet dictionary, a product specific dictionary, and a service specific dictionary. For example, a dictionary for mobile products and devices may contain words such as camera and battery. Also, for example, a dictionary for motor vehicle products may contain different words such as hood, tires, engine, trunk, steering, and transmission. At the same time, a service related dictionary for an online retailer might contain words like payment, shipping, and delivery.

An example text mining process is outlined in the following paragraphs. An embodiment can use such a text mining technique to identify important keywords and features in a marketer's product feature description web page using the NLTK. The first text mining step is to tokenize the web page content using "tokens=nltk.word_tokenize(content)." The next step is to convert the tokenized text from the page to lower case using "words=[w.lower( ) for w in tokens]." Then, an embodiment can do stemming, which is a process for finding stems of the words. The NLTK offers two stemmers, Porter and Lancaster. An embodiment can use both. For example, the following script can be used:

porter=nltk.PorterStemmer( )
    lancaster=nltk.LancasterStemmer( )
    stemedwords_first_pass=[porter.stem(t) for t in words]
    stemedwords_final_pass=[lancaster.stem(t) for t in stemedwords_first_pass]

Next, an embodiment can do lemmatization, which is a process of grouping together the different inflected forms of a word so they can be analyzed as a single item. As would be understood by one skilled in the relevant art, lemmatization is an algorithmic process of determining the lemma for a given word. Since the lemmatization process may involve complex tasks such as, for example, understanding context and determining the part of speech of a word in a sentence (which can require, for example, knowledge of the grammar of a language), it can be complex to implement a lemmatizer for a new language. Then, an embodiment can perform POS tagging, which is a process of classifying words into their parts of speech and labeling them accordingly. After POS tagging, it is known whether a word is a noun, proper noun, verb, adjective, pronoun, article, etc. For the purpose of text mining, nouns and proper nouns occurring in a page are identified. Examples of such nouns can include, for example, camera, battery, design, display, and screen. These nouns and proper nouns allow the process to identify all the subjects which particular text discusses or describes. The text mining process determines nouns and proper nouns in order of their frequency in the normalized text. For example, the following NLTK script can be used for the text mining process:

```
import nltk
import urllib
tokens = nltk.word_tokenize(comment_text)
words = [w.lower( ) for w in tokens]
porter = nltk.PorterStemmer( )
lancaster = nltk.LancasterStemmer( )
stemedwords_first_pass = [porter.stem(t) for t in words]
stemedwords_final_pass = [lancaster.stem(t) for t in stemedwords_first_pass]
wnl = nltk.WordNetLemmatizer( )
```

-continued

```
completely_normalized_words = [wnl.lemmatize(t) for t in
stemedwords_final_pass]
#Normalization Ends, Part of Speech Tagging starts
pos_tagged_words = nltk.pos_tag(completely_normalized_words)
#Extract Nouns & Proper Nouns in order of their frequency
myDict = dict( )
for key, val in sorted(pos_tagged_words):
    if((val == 'NNP' or val == 'NN') and len(key) > 3):
        if(myDict.has_key(key) == False):
            myDict[key] = 1
    else:
        myDict[key] = (myDict.get(key) + 1)
    for word in sorted(myDict, key=myDict.get, reverse=True):
        if(myDict.get(word) > 0):
            print word + ":", myDict.get(word)
```

Certain embodiments use keyword level sentiment analysis to extract keyword-level sentiment from customer's communications and postings. One such embodiment uses a keyword level sentiment engine to provide the ability to extract keyword-level sentiment. One example sentiment engine is AlchemyAPI, which has the capability of extracting such keyword-level sentiment. Also, for example, the Adobe® Phoenix and Sentiment Analysis Engine can be used in some embodiments. Alternative or additional embodiments can use any sentiment analysis engine that can detect, extract, and weight sentence affect and sentiment signals using a general purpose sentiment vocabulary combined with a NLP engine. Input for the sentiment analysis can include POS-tagged and NX/VX tagged sentences. The sentiment analysis then determines and scores the positive, negative, and neutral sentiment.

An embodiment predicts an un-subscription probability to a customer (e.g., a consumer in an email list), where the un-subscription probability indicates the probability of that customer un-subscribing from marketing communications associated with a product. An un-subscription probability for a given customer can be determined based on comparing that customer's activities to the activities of other customers who have unsubscribed. For example, an un-subscription probability for a customer can be inferred by comparing that customer's communications related to a product with communications sent by un-subscribing customers. Also, for example, by comparing a customer's interactions with marketing information associated with a product to interactions of other customers who have unsubscribed, an un-subscription probability for the customer can be predicted. A customer's interactions with a marketer's site and communications (e.g., emails) can contribute to an un-subscription probability for the customer. In some embodiments, an electronic marketing communication such as, for example, a promotional email, is sent to a customer based on the un-subscription probability assigned to the customer. Web tracking can be performed to collect information on the customer's visit(s) to the marketer's site and to determine an un-subscription probability based on the customer's interactions with the marketer's site. In embodiments, web tracking assigns a score to the customer's tracked activities and issues. The scoring can take into account the sentiment the customer has expressed towards a given product, where the sentiment is based on keyword-level analysis of the customer's prior communications and web site postings regarding the product. The scoring can contribute to an un-subscription probability for a customer. For example, sentiment scores of customers who have unsubscribed can be compared to a sentiment score of a customer in order to infer an un-subscription probability for the customer.

According to an embodiment, a sentiment of a customer towards a product (including sentiment towards product features) can contribute to an un-subscription probability. For example, if there is a negative sentiment about a product posted by the customer on a web page, the customer can be assigned higher un-subscription probability to indicate that there is a greater chance that this customer will unsubscribe from marketing communications associated with the product. In this example, if a source or referring page includes a negative review or posting for the product, the customer can be considered likely to unsubscribe (e.g., assigned a high un-subscription probability). Conversely, if the customer's sentiment about the product (e.g., posted at a web page or sent to the marketer) is positive, the customer will have a lower un-subscription probability to indicate that there is a lower chance of the customer un-subscribing to marketing communications associated with the product. In this way, a customer's sentiment can be scored based on the customer's sentiment towards a product expressed at a web site, such as a social media site or a marketer's site.

A customer's un-subscription probability can be used as an indication of how likely the customer is to continue to subscribe to a marketer's communications promoting products. That is, the un-subscription probability can indicate how good of a candidate the customer is for maintaining a subscription to promotional emails for a product. Based on the un-subscription probability, an embodiment can determine if a follow up, targeted marketing communication (e.g., a promotional email) should be sent to the customer or not. In one embodiment, a marketer sends an electronic marketing communication to a customer based on the customer's un-subscription probability exceeding a threshold. In an example where the electronic marketing communication is an email, email tracking can be used to collect information when the customers opened previous emails, and the characteristics of customers who clicked on a link provided in the email in order to unsubscribe from future marketing emails. The collected information can indicate how relevant the customer's interactions with a supplier's or marketer's site are to un-subscriptions. For example, an embodiment can assign a higher un-subscription probability to a customer that opens a link from the email and then interacts with the site to provide a negative review of the product being marketed as compared to another customer that posts a positive review of the product. In this way, embodiments avoid issues with marketing systems that merely assign the same un-subscription probability to both of such customers based on them selecting the link in a promotional email, without taking into account their very different interactions with the marketer's site after arriving at the site.

In one embodiment, a method, predicts, based at least in part on a customer's tracked sentiment towards a product or specific product features, a probability of un-subscription for that customer. According to this embodiment, the probability of un-subscription is compared to a probability threshold to determine whether marketing communications should be sent to the customer. This embodiment can determine an un-subscription probability based on the customer's sentiment towards product features. For example, a marketing communication (e.g., a promotional email) can be sent to a customer having an un-subscription probability below the threshold, but the communication will not be sent to another customer having an un-subscription probability above the threshold. In this way, un-subscription probabilities be used to determine which customers to send marketing communications to and which customers to temporarily cease sending marketing communications to. In an additional or alternative embodiment, a method identifies, for the given customer, respective un-subscription probabilities for a set of product features, and filters marketing communications so that communications corresponding to product features having low un-subscription probabilities (e.g., un-subscription probabilities below a threshold) are sent, while communications corresponding to product features having high un-subscription probabilities are not sent.

Exemplary methods can use web tracking scoring rules and email tracking scoring rules that take into account a context of a customer's postings and communications with a product supplier and the customer's interactions with the supplier's web site in order to assign an un-subscription probability to the customer. In some embodiments, the un-subscription probability is a predicted probability that the customer will unsubscribe to marketing communications associated with a given product. Based on the un-subscription probability, the customer can be categorized as someone to send marketing communications to. The un-subscription probability can also be used to determine if marketing communications should not be sent to the customer. This determination can be temporary and based on a periodically calculated un-subscription probability. For example, after the customer's un-subscription probability improves (i.e., the customer's un-subscription probability decreases), the customer can be categorized as someone to send future marketing communications to.

Sentiment can be measured based on a customer's interaction with social networking websites, such as, for example, Facebook®, Twitter®, Instagram®, Snapchat®, and Google+®. Sentiment can also be measured based on customer interaction with a marketer's website. Based on this measured sentiment, an embodiment can use a typology rule to filter out email identifiers (e.g., email addresses or aliases) of customers whose probability of un-subscription is greater than the marketer specified threshold.

Embodiments implement the following capabilities for reducing un-subscription rates. Customers can be categorized as likely to unsubscribe based at least in part on web tracking and gauging/measuring the sentiment of their interactions with a marketer's site and other web sites. For example, an un-subscription probability can take into account a customer's sentiment based on web site postings related to a product or other interactions with pages, such as a LinkedIn® page or a Facebook® page. According to these examples, a higher un-subscription probability can be assigned to a customer who is a LinkedIn® user who has exhibited negative sentiment towards a product at a LinkedIn® page. Conversely, a lower un-subscription probability can be assigned to a customer who has expressed positive sentiment regarding the product on a Facebook® page.

Embodiments can perform web tracking to collect information on Internet users (e.g., consumers and customers) that visit a marketer's website. Web tracking type scoring rules can be defined to enable marketers to assign points on the pages a customer visits. For example, an embodiment allows a marketer to create a rule, which decreases the un-subscription probabilities of all Internet users who visit a page on the marketer's website and post a positive product review.

Embodiments can also perform email tracking to collect information when customers open promotional emails and when they click on a link in the email. An email tracking rule enables a marketer to increase an un-subscription probability when a customer deletes a promotional email without opening. Conversely, the email tracking rule can also enables a marketer to decrease an un-subscription probability when the customer opens a promotional email and clicks on the link in the email in order to visit the marketer's site. For example, a marketer can create a rule that decreases a customer's un-subscription probability responsive to the customer clicking on a link provided in the email to obtain additional product information. As used herein, the term "email tracking" generally refers to tracking and scoring user interactions with a variety of electronic marketing communications. That is, the email tracking and filtering techniques described herein are not limited to email communications and can be performed for other types of marketing communications, such as, but not limited to, text messages, messages within a mobile application, social media communications, and other forms of communication with customers.

After opening a link in a marketing email, a customer's interactions with the marketer's site can be tracked to determine the customer's un-subscription probability. For example, after opening a link associated with a specific product or service (e.g., a Samsung™ Galaxy Note 5 smartphone), where the link is in an email, one customer may post a negative review of the product or service whereas another customer may post a positive review of the product or service. In this example, the former should be assigned a higher un-subscription probability as compared to the latter. Therefore, there is a need for methods and systems that take the relevance between the interactions with a marketer's website into account when determining respective un-subscription probabilities for customers.

Similarly, upon opening the link, time spent and interactions with a marketer's site may be different for various customers. For example, after opening the link from a promotional email, one customer carefully read all the information whereas another customer quickly left the marketer's site. In this example, the former should be assigned a lower un-subscription probability as compared to the latter. Therefore, there is a need for systems and methods that take customer interactions with a marketer's website into account when assigning un-subscription probabilities to customers.

Un-subscription rates can be reduced by taking into account a customer's sentiment determined from prior communications and interactions so that marketing communications are not sent to customers when sending the communication is deemed likely to cause the customer to unsubscribe from future communications. Using conventional techniques, all customers in a list (e.g., an email list) are sent marketing communications without first determining their respective un-subscription probabilities, resulting in un-subscriptions for customers in the list. These un-subscriptions are disruptive to sales teams and cause wastage of resources and money for marketers.

Example use cases are discussed below with a customer browsing related pages, spending more time on a marketer's site, which signifies higher interest and therefore that customer gets a lower un-subscription probability. In embodiments, a customer's un-subscription probability is based on the customer's interactions on the marketer's website, actions tracked via web tracking, and clicking on a link in an email, which can be tracked via email tracking.

Consider a use case where a customer who was sent an email with a link to a product site for a smartphone. The customer clicked on the link, but just after navigating to the product site, he navigated away from the site to another section of the web site unrelated to the product (e.g., a consumer appliance section of the site). In this example, a customer opened the email link, but quickly navigated away from the smartphone page to a refrigerator section of the site instead of reviewing information related to the smartphone product.

According to an embodiment, this customer will be given a higher un-subscription probability as compared to another customer that clicked on the same link and remained on the smartphone product page while spending considerable time and reading all the information related to the smartphone. In this embodiment, the 'context of the promotional email' (e.g., the email with the link to the smartphone product site) and the 'context of the customer website visit after clicking the link' are both taken into account when assigning a un-subscription probability based on a link selected in the promotional email.

In another example, consider a Facebook® user who has purchased a product and posted a highly positive comment for the product on Facebook®. At this point, an embodiment will assign a lower probability of un-subscribing to this customer. This is done to correlate the positive sentiment in the mind of this customer/purchaser with a reduced likelihood that the customer will unsubscribe to marketing communications associated with the product.

To provide effective, timely marketing information to customers (i.e., marketing communications that are of interest to the customers), it can be desirable to understand how customers are discussing the products they have purchased. For example, if a company launches a new smartphone product having a built in camera with a 13 megapixel sensor, 1080p video recording capabilities, and other features, it may be desirable to providing marketing communications highlighting features of the smartphone's camera that may be of particular interest to certain customers. If the addition of low light performance features to a smartphone camera generates interest to a group of customers, such as customers in a particular demographic, a marketer might desire to emphasize low light performance in marketing communications sent to customers in that demographic group. Alternatively, if customers dislike the 1080p video recording quality, a marketer may deemphasize the video recording aspects, while emphasizing other aspects of the smartphone's camera in communications sent to these customers. Further, these consumer preferences may change over time. In certain embodiments, these preferences can be identified and correlated to un-subscription probabilities for the subsets of consumers that share the preferences. That is, marketing communications tailored to emphasize features of interest to identified groups of customers can result in reduced un-subscription rates.

For example, if the smartphone's camera initially has a software bug that corrupts recorded video files, which generates a significant negative reaction by customers, a marketer might deemphasize the video recording aspects of the smartphone's built in camera in marketing communications or temporarily cease sending marketing communications to the customers until the issue is resolved (i.e., until the bug is fixed). Then later, after updated video recording software is provided to fix the software bug, and sentiment toward the video recording capabilities becomes positive, the marketer might wish to harness the positive sentiments about the software fix and emphasize the "improved" video recording capabilities of the smartphone in marketing communications.

Embodiments according to the present disclosure seek to assess customer sentiment about products and their features by capturing information posted to various social media Internet sites, such as Facebook®, Twitter®, etc., and using that information to tailor marketing communications and send them to customer populations that are have a low probability of un-subscribing to the communications (i.e., are unlikely to unsubscribe). By collecting comments regarding a particular product of interest, a marketer may be able to assess customer sentiment regarding the product and, if some of the collected comments highlight particular features of the product, identify those features that are generating discussion, whether positive or negative, about the product.

The gathered comments may then be analyzed for the customer's sentiment to identify whether the comments praise or disparage the product or its features. In addition, information about the customers may be used to identify demographic information associated with the comments, and thus to generate information regarding how different demographics view the product and its features. For example, considering the smartphone example, customers in the 19-29 year age range may comment positively about the high-resolution 13 megapixel sensor of the phone's camera, while the 45-54 year age range may show strong positive feelings about the convenience of the smartphone's battery life. Thus, a marketer may be able to generate and provide different marketing materials to different groups of customers based on their demographics.

Continuing this example, the marketer may generate promotional email messages using one or more databases of customers' email addresses, demographics and/or other information. For customers in the 19-29 year age range, the marketer may generate an email with a subject line that states 'Stunning 13 megapixel camera included in new smartphone from XYZ Company' or otherwise highlights that feature, while, for customers in the 45-54 year age range, the marketer may generate an email with a subject line that states 'Excellent battery life and camera features in new smartphone from XYZ Company' Or otherwise highlights that feature. In addition, when generating these emails, the marketer may also choose to avoid mentioning or much discussion of features about which there has been significant negative commentary. Thus, while email messages to the 45-54 year age range may emphasize the smartphone's battery life, and might mention the 13 megapixel camera sensor, it may omit discussion of issues related to low light performance of the smartphone's built in camera or buggy 1080p video recording functionality.

However, because in some embodiments customer comments may be continuously gathered from one or more social media Internet sites, once the software update to resolve the buggy 1080p video recording product feature is released, and customer comments begin to view the update and the video recording functionality positively, the marketer may revise later marketing emails, or even revise dynamic content referenced by previously-transmitted emails, to include information regarding the 1080p video recording functionality.

Thus, by retrieving and analyzing customer-generated comments in real-time from one or more social media Internet sites, a marketer or marketing organization may be able to generate more relevant and timely marketing communications for customers, and send them to customers who are deemed unlikely to unsubscribe from the communications. Such communications can be sent to demographic groups of customers according to their respective interests as assessed from customer-generated comments.

As used herein, the term "marketing system" refers to a computerized system for one or more of managing information about one or more consumers or customers, storing and accessing information about the one or more customers, such as, for example a list of customers' contact information (e.g., a list of email addresses), distributing marketing communications to customers, tracking customer interactions with the communications (e.g., selection of links, un-subscriptions), planning and executing marketing campaigns, and tracking the performance of marketing campaigns. In some embodiments, a marketing system can employ one or more computing devices or computer systems in communication with each other to provide the functionality of a marketing system. For example, in one embodiment, a marketing system may include different computer systems for managing information about customers, for storing and accessing information about the customers, planning one or more marketing campaigns, executing one or more marketing campaigns, tracking customer activities and issues related to a product, determining un-subscription probabilities for the customers, sending marketing communications to customers whose un-subscription probabilities are below a threshold, and/or tracking the performance of one or more marketing campaigns. In some embodiments, a marketing system may be embodied entirely within a single computer system. For example, a single application may embody all of the functionality of a marketing system and provide one or more tools (as described below) for performing the functions of a marketing system.

As used herein, the term "marketing campaign" refers to a process that includes identifying a target product to be marketed, identifying a target customer population to receiving marketing communications based on features and characteristics of the target product, and generating and sending communications to the target customer population about the target product. For example, in some embodiments, new products may be identified as target products and target customer populations may be identified based on demographic information about demographics who bought a previous version of the new products, or demographics of those customers who bought similar types of products in the past. In some examples, a user of a marketing system can identify a target product and its features. Sending marketing communications can include automatically generating electronic or printed materials about the target product that emphasize interesting features of the target product and may be sent once, or repeatedly over time, to members of the target customer population. Marketing campaigns can also include obtaining feedback regarding the effectiveness of the marketing campaign and changing the content of communications or the target customer population(s) based on the feedback. For example, customers deemed likely to unsubscribe from the communications due to an outstanding service issue may be temporarily removed from a list of recipients for the communications until the issue is resolved. In this way, embodiments avoid having those customers unsubscribe from future communications.

As used herein, the term "tools" refers to computer-implemented functions, such as applications or procedures, for performing one or more tasks. In some embodiments, tools may provide user interfaces to enable a user to interact with the tool to accomplish a particular task. For example, tools discussed herein include tools for planning a marketing campaign, tools for targeting particular customers or groups of customers, executing a marketing campaign, and tracking a marketing campaign. In some embodiments, multiple tools may be incorporated into a single software application. For example, a tool may combine the functionality of aggregating and organizing information about customers and for targeting particular customers or groups of customers for a marketing campaign. In some embodiments, multiple applications may work in concert to perform as a tool. For example, a tool for executing a marketing campaign may employ a software application for sending emails, a separate software application for generating marketing materials, and a separate software application for extracting or importing contact information regarding targeted customers.

As used herein, the term "real time tracking system" refers to a computerized system for capturing data from a data source in real time, or near-real-time, or for capturing data from a data source for use in a real-time or near-real-time process, or both. For example, in some embodiments, a marketing system may execute a marketing campaign by, in part, generating and transmitting marketing information to a target customer population. For instance, the target customer population can comprise customers whose probability of un-subscribing is below a certain threshold. During this process, the real time tracking system may capture data relevant to the marketing campaign that causes the marketing campaign to be modified during its execution. Thus, in one embodiment, information sent to one customer may differ from information sent at a later time to another customer, or the same customer, based on information captured by the real time tracking system. Further, in some embodiments, a real time tracking system may also be configured to request and/or receive data from a data source as the data is generated. For example, in some embodiments, a real time tracking system may transmit a request for data to a data source and, as relevant data is generated by the data source, e.g., as customers post comments to a social media site, the data source provides the data to the real time tracking system.

As used herein, the term "email tracking" refers to collecting information regarding customer interactions with a variety of marketing communications. The email tracking techniques described herein are not limited to email communications and can be performed for other types of marketing communications, such as, but not limited to, text messages, social media communications, and other forms of communication.

As used herein, the terms "sentiment" and "customer sentiment" refer to an emotion, affinity, or attitude and may refer to an individualized sentiment, e.g., of a single customer, or to an aggregate sentiment, e.g., of a plurality of customers. For example, in the context of a marketing system, it may be useful to understand customer sentiment towards a product before sending communications related to the product to the customer. Thus, it may be useful to estimate a customer's attitude or reaction to a product or features of the product. For example, a customer may like or dislike a product, or be desirous or indifferent towards a product. Further, sentiments may also include a strength or magnitude. For example, a sentiment may be strong or powerful, or may be weak, lukewarm, or tepid. In addition and according to context, "sentiment" may also refer to a measured or calculated value reflecting such an emotion, affinity, or attitude. For example, according to some embodiments, a software application may attempt to calculate a sentiment associated with text. Such a software application may analyze the semantic meaning of the words in a portion of text and calculate a score, such as a positive or negative floating-point value between −1 and 1, though other scales, ranges, or values are within the scope of this disclosure. In addition, in some embodiments, a sentiment may also include a confidence score indicating the determined accuracy of the calculated sentiment. Thus, a sentiment score may have a value of 0.998 indicating a strongly-positive sentiment, however, it may only have a confidence score of 0.6, indicating that while the sentiment is apparently strongly positive, there is uncertainty as to the accuracy of the score, potentially due to ambiguous phrasing, multiple possible senses of one or more words, misspellings, or lack of punctuation.

As used herein, the term "sentiment engine" refers to a software application (or applications) that are configured to calculate sentiments of expressions that have been provided to the sentiment engine. For example, one embodiment of a sentiment may be configured to receive text strings with natural language expressions and to analyze these text strings to calculate a sentiment score for the expressions. Other embodiments may be configured to receive spoken words and calculate sentiment scores for the spoken words and/or phrases. Further, a sentiment engine, in some embodiments, is configured to output data indicating the sentiment score and the associated words or phrases, such as by generating textual strings or binary data streams.

As used herein, a "computing device" refers to any type of computing device configured to communicate with another computing device over a network to access information, including mobile computing devices and other computing devices. A mobile computing device may allow mobility to the user during at least operation and may include, for example, a mobile phone, a smartphone, a personal digital assistant (PDA), a tablet device, and other mobile computing devices. In comparison, other computing devices may be more stationary, may include relatively more processing power and memory space than those of mobile computing devices, and may have an operating system that is more sophisticated than operating systems typically running on mobile computing devices. A laptop, a personal computer, a desktop computer, and a server are examples of such other computing devices.

As used herein, "application" refers to a program configured to access and retrieve information hosted on a computing system (e.g., content from a web site hosted on a server, web management system, and/or a content delivery system) and to render the information at a user interface. Examples of such an application include a web browser, a script or a plug-in that runs within a web browser, a program that is hosted in a web browser, a program that is separate from but that interfaces with a web browser such as a social media application, a mobile application, and other types of programs capable of using local memory and a rendering engine to access and render content.

Embodiments according to this disclosure may be advantageously used in combination with one or more marketing systems, such as, for example, Adobe® Campaign®, to generate and execute a marketing campaign. A suitable marketing system may include a number of components to assist a marketer or marketing organization with developing and implementing a marketing campaign, particularly in the case of targeted marketing campaigns involving outbound marketing communications sent to customers. A marketing system may include a number of different tools to enable a marketer, or marketing organization, to plan a marketing campaign, select a target customer group, select activities and issues to be tracked, execute the campaign, determine un-subscription probabilities for members of the customer group, send marketing communications to members of the customer group having un-subscription probabilities below a threshold, and the track the effectiveness of the campaign. These tools may be accessible to the marketer through various graphical user interfaces (GUIs) at a user computer.

An example marketing system usable in conjunction with real-time customer sentiment analysis includes multiple interconnected components. These components typically include one or more data repositories to store information about customers, as well as planning tools, tools for identifying customers, tools for executing the campaign, tools for distributing marketing communications to customers, and tools for tracking the progress and effectiveness of the marketing campaign and the marketing communications.

Example Systems

FIG. 1 shows an example marketing system 110. The marketing system 110 includes one or more computer systems and tools 112 to allow users to plan and execute marketing campaigns and a data store 114 for storing information about customers, information about products, and information about un-subscriptions triggered by past marketing communications. In one example, the data store 114 can be used to store a master marketing profile of customers that includes customer contact information (e.g., email addresses in an email list) and customer sentiment towards products, their features, and any service related issues associated with the products.

The marketing system 110 is connected by a communications network 120 to one or more data providers 130-134. These data providers 130-134 gather and analyze information about individuals for use in marketing campaigns. For example, a data provider may create records for a number of different individuals and store as much known information about them as possible, such as name, address, date of birth, gender, interests, hobbies, friends and family, etc. A marketer or marketing organization may then purchase data from these data providers and import that data into the marketing system's data store 114 for use in planning and executing marketing campaigns, or may access such data from the data providers' databases on an as-needed basis. In an embodiment, a marketer or marketing organization can identify a target product and product features using marketing system 110.

A significant component of many suitable marketing systems is the customer information. Customer information can be obtained from a variety of different sources and may be stored in multiple data repositories for use by a marketing organization. To provide easier access to what can be a substantial amount of information, some suitable marketing systems include functionality referred to herein as a "customer view." A customer view provides an integrated aggregation of personally-identifiable information ("PII") or other information about a specific individual. Such information can include a name, address, telephone number, email address, social media contact information, friends, family, known likes or dislikes, known hobbies, etc. In short, any data about a customer that can be gathered and stored, while also protecting the privacy of the customer and the customer's PII. This information can then be extracted from data stores 114, 130-134, integrated into a single profile of the customer, and presented to a marketer for analysis. Or, in some embodiments, the single customer view can be accessed by automated tools to identify particular characteristics, such as demographic information, hobbies, interests, or other information that might be useful when generating a marketing campaign or other marketing materials.

The PII may be obtained in any number of ways, such as by purchasing it from a data aggregator as discussed above, retrieving publicly-available information from the Internet, accessing customer profiles or records maintained by the marketing organization itself, integration with other backend systems like Salesforce, or other information source. In some cases, data may be gathered slowly or piecemeal. For example, a marketing organization may ask visitors to a website to answer a few survey questions. Subsequent visits may sometimes trigger an additional small number of survey questions. In such a way, a customer may be willing to provide a small amount of information when they might otherwise be unwilling to respond to a lengthy survey. The marketing system 110 will receive this information and incorporated it into its data store(s) 114.

The marketing system 110 is also connected by an electronic communications network 140 to one or more customers 150-154, such as by email, social media sites or platforms, mobile applications, text messages, telephone or other communications method. In some cases, the marketing system 110 may be connected to or in communication with customers and customers by non-electronic means, such as by direct mail. These different means of communication are generally referred to as "channels" or "communications channels." The marketing system 110 employs these channels to send marketing information, such as email messages, to the customers 150-154 with information or offers regarding one or more products or services. Thus, the entire system 100 shown in FIG. 1 provides the marketing system 110 with information regarding customers, the tools to create and distribute marketing information to those customers, and the mechanisms by which to pass that information along to the customers.

Figure 2:
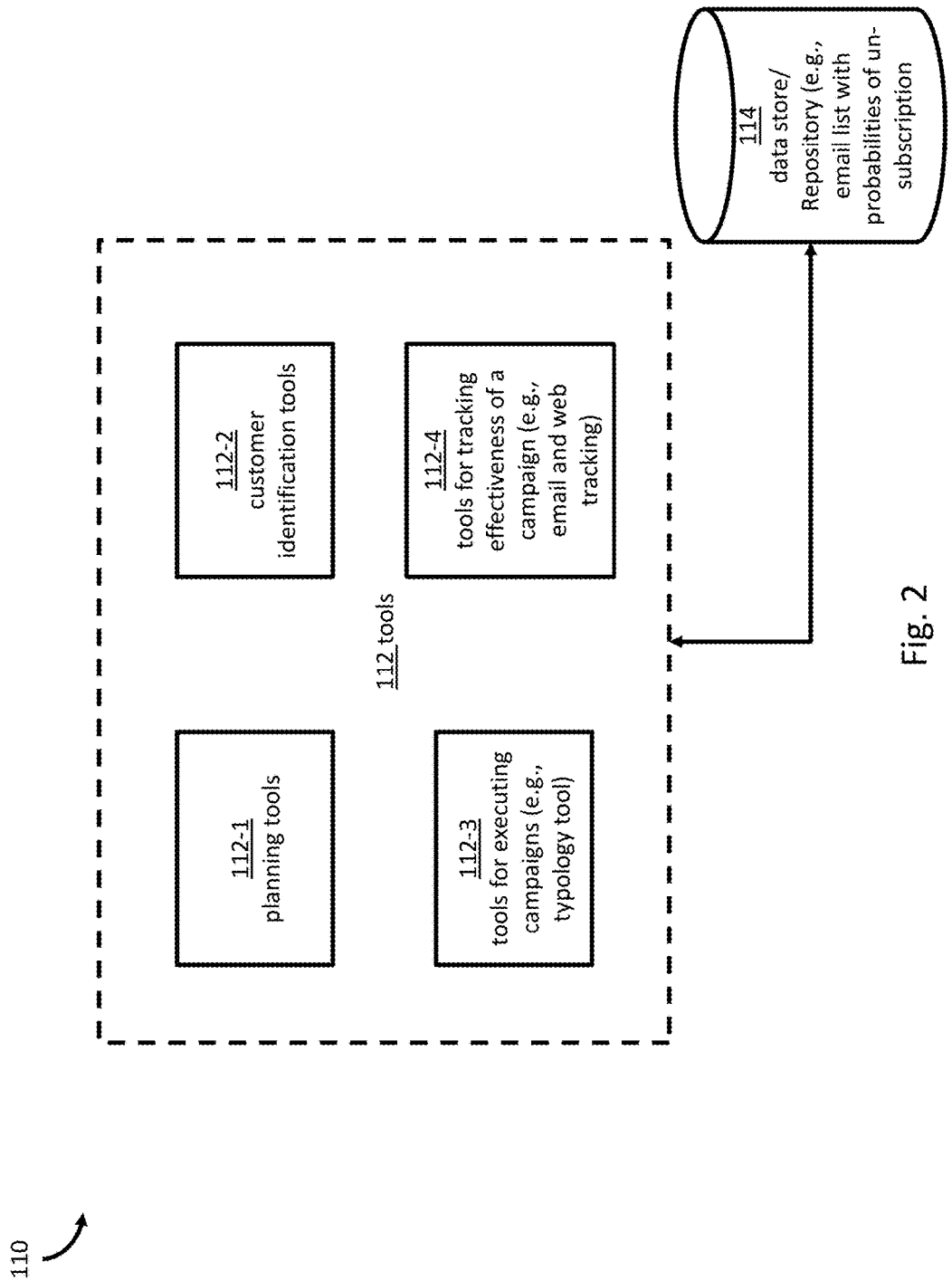

As discussed above, a marketing system 110 includes, in addition to the data stores or repositories 114, tools for planning and executing marketing campaigns. FIG. 2 shows some example components of the marketing system 110 of FIG. 1. These tools include planning tools 112-1, customer identification tools 112-2 for identifying particular consumers or groups of customers (e.g., customers in an email list), tools for executing marketing campaigns 112-3, and tools for tracking the effectiveness of a marketing campaign 112-4. These different tools work together to enable a marketer or marketing organization to effectively plan and execute marketing campaigns. As shown in FIG. 2, tools for executing marketing campaigns 112-3 can include a typology tool used to set delivery properties for marketing communications.

In the embodiment shown in FIG. 2, the planning tool 112-1 allows a marketer to select a product to be marketed, identify the features of the product to be emphasized or promoted, identify characteristics of customers for targeting, select different channels through which to send marketing communications (e.g., email and text messages), and embed tracking information into marketing communications or related websites. For example, the planning tool 112-1 can provide integrated views of different targeted customers based on PII acquired from one or more data aggregators, or developed over time by the marketing organization itself. The planning tool 112-1 can also provide graphical tools to enable a marketer to identify products and features to be marketed, and identify demographic groups of interest for a marketing campaign, such as by specifying desirable characteristics of the target customers.

In addition, the planning tool 112-1 can provide options for different channels through which to send marketing materials, frequencies at which to send materials, and the types of materials to send. For example, one suitable system employs a planning tool 112-1 to allow a user to select from a pool of communication channels such as email, instant messaging, direct mail, text messaging, telephone calls, in-app messaging (e.g., messages within mobile applications), faxes, or Internet advertisements. In addition, a marketer or marketing organization may use the planning tool 112-1 to determine or establish how often marketing messages are communicated. For example, the planning tool 112-1 may include information indicating a change in effectiveness for different communication channels depending on the frequency of communication that results in lower un-subscription rates. If, in one embodiment, email messages sent every two to three days generate higher un-subscription rates, rather than those sent daily or weekly, the planning tool can assist the marketer in selecting the frequency of communication that results in lower un-subscription rates.

In addition, the planning tool 112-1 can assist in determining whether to include coupons, rebates, package offers, or other types of incentives or information in marketing communications sent as a part of a particular marketing campaign. The planning tool 112-1 also provides tools to create or import marketing communications. For example, a marketer may be able to generate content, such as graphics and text, and subject line information for email messages to be sent as a part of a marketing campaign.

The planning tool 112-1, in some embodiments, may also include functionality that allows the marketer to embed tracking information into such content. For example, when creating content for an email marketing campaign, the marketer may include Internet links (or Uniform Resource Locator or "URL") to an advertised product, but insert a link that takes the customer to a page that, in addition to providing the desired information or shopping experience to the customer, also transmits information back to the marketer. In addition, the planning tool 112-1 may be capable of generating information to leverage such functionality in third-party web sites, such as Amazon, to enable tracking functionality to track whether the customer has clicked on a link in the email message, and whether the customer ultimately obtained or provided additional information about the product, including more fine-grained information such as whether the customer posted a review of the product, how long the customer spent at the marketer's site, whether the customer used the site to send communications to the marketer (e.g., submitted a survey or query via the site), and the sentiment of the customer's posting or communications. Such information may be received by the marketing system and used by a tracking tool 112-4, which is described in greater detail below.

A part of planning a marketing campaign includes selecting the target audience for the campaign, and some suitable embodiments, such as the embodiment shown in FIG. 2, include customer identification tools 112-2 for identifying customers who are in a selected population of customers. The customers identified by customer identification tools 112-2 may be sent marketing communications associated with a campaign. For example, some embodiments may employ an email list identifying customers to receive marketing emails based on respective probabilities of un-subscription assigned to the customers. In this example, customers included in the email list will have relatively low un-subscription probabilities. The un-subscription probability can be expressed as percentages. The un-subscription probabilities may be assigned based on web tracking and email tracking Some such tools may temporarily cease sending promotional communications to customers who have been categorized as highly likely to unsubscribe to marketing communications. In an embodiment the web and email tracking can be performed by tracking tools 112-4 for tracking the effectiveness of a campaign. The web tracking can, for example, collect information indicating a degree of sentiment from a referral source referring a customer to a web page associated with a product or service. Also, for example, the email tracking can collect information indicating relevance between interaction with a marketing communication (e.g., a promotional email) sent to the customer and the customer's interactions with a marketer's web page. In cases where the marketing communication is an email, a link for the marketer's web page can be specified in the email and the relevance between the context of the promotional email and the customer's interactions on the web page can be determined based on a total time of the customer's interactions with content of the web page that is relevant to a specified product. Example tools 112-4 are described below.

Customer identification tools 112-2 may be used to generate lists of customers (e.g., email lists) based on personally identifiable information (PII), such as a broad demographic group, e.g., all women customers between the ages of 30 to 40. Such a tool may enable a marketer or marketing organization to quickly identify a target customer population to be sent marketing information based on their membership in demographic group as a whole. Some embodiments may also employ more customizable control over marketing communications and allow more targeted marketing campaigns. For example, the subject and content of promotional emails can be tailored to specified groups or subsets of customers by using one or more communications tools included in tools 112-3 for executing a campaign. In embodiments where the marketing communications include promotional emails, the communications tools can interface with an email server configured to transmit email messages to customers identified by customer identification tools 112-2. For example, the email sever can transmit emails to a subset of customers in an email list who have un-subscription probabilities below a certain threshold. According to this embodiment, by temporarily ceasing transmission of emails to identified customers having un-subscription probabilities above the threshold, the efficiency of the email server is improved. This is, the workload of the email server is reduced by not having it send emails to customers who are likely to unsubscribe as a result of receiving the emails. This embodiment also improves the operation of marketing system 110 by reducing the need to process un-subscription requests submitted by customers. For instance, by avoiding sending a promotional email to customers who are likely to submit an unsubscribe request as a result of receiving the email, marketing system 110 will have less unsubscribe requests to process.

In some embodiments, the planning tool 112-1 may also comprise functionality to enable a marketer or user to adjust a marketing campaign in real time based on information collected from social media sites. As will be discussed in greater detail below with reference to FIG. 3, a marketing system 310 may obtain information from social media sites for use with planning a marketing campaign. The information received from the social media sites may affect rankings of particular keywords or may affect the relevance of particular features of a product with respect to different target demographic groups within a list of customers. By providing such information to a user in a graphical display, such as by providing selectable features in a ranked manner, a user may be able to quickly identify a particular target demographic, select one or more features of particular relevance to the demographic based on the social media site information, and thus tailor the marketing campaign appropriately. Further, such functionality may be employed while the marketing campaign is executed to orchestrate the marketing campaign in real time. For example, if a particular feature becomes more relevant to a particular target group of customers, the planning tool 112-1 may allow a user to visually detect the increased relevance of the particular feature, and use the tool to incorporate the feature into the marketing campaign with respect to one or more target demographics. Thus, the planning tool may be employed to graphically orchestrate a marketing campaign in real time based on information obtained from one or more social media sites.

The exemplary embodiment shown in FIG. 2 also includes tools 112-3 for executing marketing campaigns once the campaign has been planned and a target customer population has been selected. The execution tool 112-3 provides functionality to generate and transmit marketing communications to the target customer population using the channels identified by the planning tool. For example, the execution tool 112-3 may be configured to create email messages based on the content created or imported in the planning tool, or to output print materials for a direct mail marketing campaign. The execution tool 112-3 can also be configured to transmit the email messages to the target customer population.

Further, the execution tool 112-3 can be configured to schedule periodic transmissions of the marketing information. For example, in one example marketing campaign, the marketer may have developed an initial marketing message, a follow-up message, and a "final offer" message to be sent over the course of two weeks to advertise a sale for a client. The execution tool 112-3 can be supplied with information regarding the timing of particular messages, how to handle "bounceback" messages, such as from an unreachable email address, and the time of day at which to send the messages.

Once a marketing campaign has begun, it can be useful for the marketer or marketing organization to measure the performance of the campaign. Thus, the exemplary embodiment shown in FIG. 2 includes a tracking tool 112-4 that receives, analyzes, and stores tracking information during the course of a marketing campaign. For example, an email sent by the campaign may send tracking information to the tracking tool 112-4 when the email is opened, which the tracking tool 112-4 may store in the repository. In addition, as alluded to above, tracking information may be embedded within web pages corresponding to Internet links within a marketing email, or may be created as a customer browses or shops on an Internet site associated with the marketing email.

As shown in FIG. 2, tracking tools 112-4 can perform web tracking and email tracking. For example, tracking tools 112-4 can collect and analyze referral source context, such as the context of a referring web page, and a degree of sentiment at a referral source, such as the degree of sentiment (positive or negative) at the referring web page. Also, for example, tracking tool 112-4 can collect information indicating relevance between the context of a promotional email and a customer's interactions on a page whose URL is indicated in the promotional email.

For example, in some embodiments, a targeted customer receives an email as a part of the marketing campaign and opens the email, at which time tracking information is sent to the tracking tool 112-4 indicating that the customer has opened the email and indicating the time the email was opened. The customer then clicks a URL within the email, which opens the customer's web browser, or a new tab in the customer's web browser to navigate the customer to the selected web page. In this case, the web page can be an unsubscribe page (i.e., if the URL corresponds to an 'unsubscribe' link in the email), the marketer's product page, or part of an online retail store (i.e., a product page for an online retailer). Information within the URL causes the web page to transmit information to the tracking tool 112-4 indicating the identity of the customer that clicked on the URL and the time at which the customer clicked on the URL. If the URL is an unsubscribe link, tracking tool 112-4 will collect information indicating any issues the customer had that may be related to the unsubscribe action.

As another example, if the customer has a user account at the online retail store, information about the customer may be extracted from the user account and incorporated into the data store 114. In this example, the URL leads to a web page offering accessories for a smartphone product for sale, and includes an option to add the accessories to the customer's shopping cart. When the customer selects an option to add an accessory for the phone to her shopping cart, the web page sends tracking information to the tracking tool 112-4 indicating that the customer has added the accessory to the shopping cart. Subsequently, the customer may remove the item from her shopping cart, in which case, the web page sends additional tracking information indicating that the customer has removed the phone accessory from her shopping cart. In such a case, the tracking tool 112-4 stores that information in the data store 114 and may send a message to the execution tool 112-3 to send a further email to the customer to encourage her to purchase the item, such as a coupon or discount offer.

Alternatively, the customer may simply abandon her shopping cart without purchasing any item. Upon detecting that the customer has abandoned her shopping cart, with the phone accessory in it, the web page may transmit tracking information to the tracking tool 112-4 to indicate that the customer has abandoned the purchase of the smartphone accessory. The tracking tool 112-4 may store this information in the data store 114, and may also transmit a message to the execution tools 112-3 to send a further email to the customer to encourage her to purchase additional accessories or services for the phone, such as a coupon or discount offer for an accessory. In some cases, the customer may purchase an accessory for the phone, in which case, the web page may transmit tracking information to the tracking tool 112-4 indicating that the customer has purchased the accessory, which the tracking tool 112-4 may store in the data store 114. Based on this positive outcome, e.g., the accessory purchase, an embodiment decreases the probability of this customer un-subscribing from future promotional emails.

The tracking tool 112-4, upon receiving various types of tracking information, including those discussed above, may store some or all of such tracking information in the data store 114. The tracking tool 112-4, in some embodiments, includes functionality to allow a user, such as a marketer, to access the tracking information and to request or to generate tracking reports. For example, some embodiments of the tracking tool 112-4 include functionality to allow the marketer to view or determine statistical information regarding the number of customers contacted by email during the marketing campaign, the number of users who opened the email, the number of users who clicked on a URL in the email, and the number of users who purchased the marketed product. Such statistical information may provide the user, such as the marketer or the marketer's client, with information regarding the effectiveness of the marketing campaign. If a large percentage of customers maintained subscriptions to marketing communications associated with the product, the marketer or the marketer's client may be able to more easily replicate the success by adhering to a similar marketing communication strategy in the future.

Alternatively, if a small percentage of the targeted customers maintained subscriptions to communications associated with the product, the marketer may be able to use the tracking information to determine why the un-subscription rate for those customers was relatively high. For example, if only a very small number of targeted customers opted to continue receiving marketing emails, the marketer may be able to revise the types of emails sent or the subject lines of the emails to better capture interest in the emails. Alternatively, if a significant number of targeted customers opened the email, clicked on the link, and added the product to their cart, but ultimately abandoned the shopping cart, the marketer may conclude that the price of the product was too high, and may consider alternative marketing strategies, including rebates or other incentives.

Thus, marketing system 110, in some embodiments, may provide end-to-end tools for planning, executing, and analyzing the effectiveness of marketing campaigns. And embodiments according to the present disclosure may integrate with such a marketing system 110 to provide enhanced marketing intelligence for planning and executing marketing campaigns, such as by providing real-time information regarding customers' interests and focuses regarding particular products, which may allow a marketer or marketing organization to better plan a marketing campaign, or to adjust a marketing campaign on-the-fly to keep pace with shifting customer sentiments.

Figure 3:
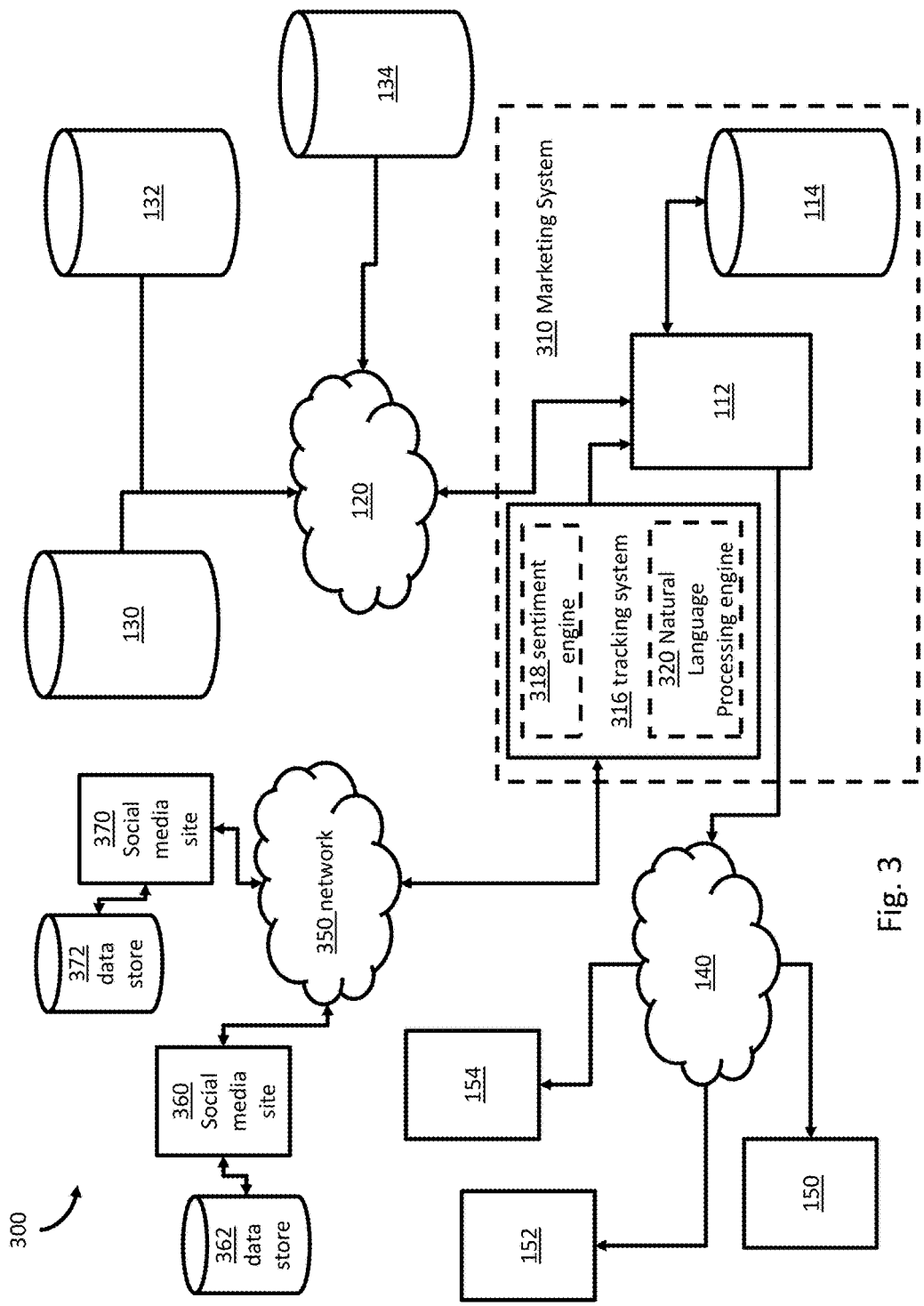

FIG. 3 shows a system 300 for providing real-time marketing campaigns according to one embodiment. The system 300 includes a marketing system 310, which provides a data repository or data store 114 for storing information regarding customers that may be useful in deciding whether to provide marketing communications to those persons. For example, the respective un-subscription probabilities of customers can be stored in data store 114 so that marketing system 310 can selectively send marketing communications to just a subset of customers having un-subscription probabilities below a certain threshold. The marketing system 310 also includes one or more tools 112 for use in planning a marketing campaign, communicating with a population of customers, executing the marketing campaign, and tracking the effectiveness of the marketing campaign as described above with respect to the exemplary systems shown in FIGS. 1 and 2. The system 300 further comprises a real-time tracking system 316 for capturing customer information and sentiment in real-time or near-real-time and providing the customer information and sentiments to the marketing system 310.

The real-time tracking system 316 comprises one or more computers or virtual machines, and is configured to execute program code stored in one or more computer-readable media to execute one or more methods according to this disclosure. In addition, the real-time tracking system 316 includes one or more network or communications interfaces for communicating with one or more other computer systems, devices, or networks. The real-time tracking system 316 is in communication with the one or more tools 112 of the marketing system 310. In addition, the real-time tracking system 316 is in communication with one or more networks, including network 350. In some embodiments, the real-time tracking system 316 may comprise, or be in communication with, one or more user interface devices, such as a keyboard, mouse, monitor, touch-sensitive input device, touch screen, or other user interface device.

In addition, in the embodiment shown in FIG. 3, the real time tracking system 316 comprises a sentiment engine. As discussed above, a sentiment engine includes a software application (or applications) configured to calculate sentiments of expressions that have been provided to the sentiment engine. As shown in FIG. 3, the sentiment engine may be a part of the real time tracking system 316 or may execute on one or more computer systems configured to execute the real time tracking system. However, in some embodiments, the sentiment engine 318 may be a separate component in communication with the marketing system 310. For example, in one embodiment, marketing system 310 can include a sentiment engine 318 that is in communication with the other components of the marketing system, including the one or more tools 112, which can be hosted by a computing system configured to execute the various tools 112-1 to 112-4 as well as the real time tracking system 316 and the data store 114. In some embodiments, the real time tracking system 316 or one or more of the tools 112-1 to 112-4 may employ, such as by invoking, the sentiment engine 318, such as by providing one or more sets of data to the sentiment engine 318 for sentiment analysis. For example, the real-time tracking system 316 may be configured to provide one or more customer comments to the sentiment engine 318 that have been received from the one or more social media sites 360, 370.

In some exemplary embodiments, the marketing system 310 also may be in communication with a plurality of social media Internet sites, such as Facebook® 360 and Twitter® 370, via network 350. In other embodiments, the marketing system 310 may be in communication with additional or other social media Internet sites, such as Instagram®, Snapchat®, Google+®, or others. The social media Internet sites 360, 370 may be in communication with one or more data stores 362, 372 that store comments, pictures, video, apps, or other content provided by the social media site itself or by one or more customers who have used the site. In some embodiments, social media Internet sites 360, 370 provide respective application programming interfaces (APIs) to enable third parties to access and retrieve information from the social media sites 360, 370, such as individual comments, statistical information about comments or keywords, likes, or other user-generated content, including images and video. For example, Facebook® has a Keyword Insights API for obtaining statistical information about identified keywords and a Public Feed API for obtaining user comments containing identified keywords. Further, for example, Twitter® has a similar set of APIs available, and other social media sites are expected to provide or are already providing similar APIs.

In an embodiment, the real-time tracking system 316 is configured to track sentiment information from both Facebook® and Twitter® to assist with reducing un-subscription rates by filtering marketing communications so that they are only sent to customers whose un-subscription probabilities are below a defined threshold. For example, a marketer employing tracked results may determine that marketing communications directed to "Note 4" customers with a focus on the product's "camera" may be best targeted towards customers in the 18-34 year old age range as 75% of the positive comments posted on Facebook® regarding the Note 4's camera are from this age range, irrespective of gender. However, if the real-time tracking system 316 transmits a different query, the results may indicate a different customer group should sent the marketing communications.

In the embodiment shown in FIG. 3, the marketing system 310 includes the same or similar components of the marketing system 110 shown in FIG. 1, but also includes the real-time tracking system 316. Other embodiments may comprise alternative configurations. For example, the real-time tracking system 316 can be defined within a software module separate from, but interfaced with the remainder of the marketing system 310, including marketing system tools 112 and the data store 114. In other embodiments, the real-time tracking system 316 may be entirely separate from the marketing system 310.

Example Methods

Embodiments provide intelligent typology rules and determine un-subscription probabilities that result in reduced un-subscription rates for marketing communications. Steps of an example method are described below with reference to FIG. 4.

Figure 4:
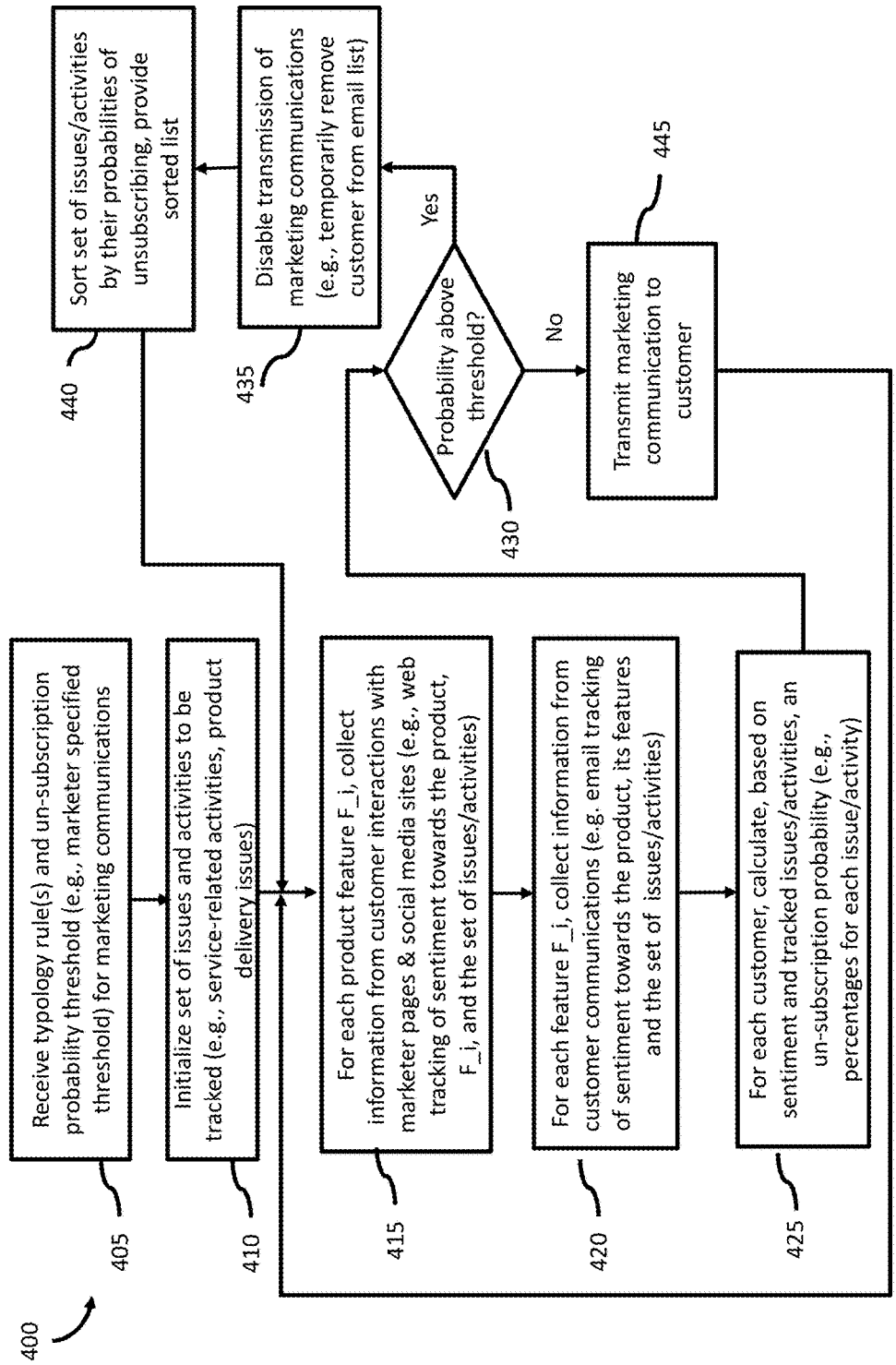
FIG. 4 shows a method for reducing un-subscription rates for marketing communications, in accordance with embodiments.

FIG. 4 is a flowchart of a method 400 according to certain exemplary embodiments. FIG. 4 is described with respect to a software application executed by the systems 110 and 310 shown in FIGS. 1-3; however, the methods disclosed herein are not limited to execution by only the system 310 shown in FIG. 3, but rather may be executed by any suitable system according to this disclosure. In addition, the method 400 of FIG. 4 will be discussed with respect to marketing a product having certain features and predicting un-subscription probabilities for communications associated with that product. The blocks of the method 400 do not necessarily have to occur in the order shown in FIG. 4 and described below. According to embodiments, some of the blocks shown in FIG. 4 can be optional.

The method 400 begins in block 405 when a marketer uses a marketing system to select one or more typology settings and to set a un-subscription probability threshold. As shown, block 405 can include receiving a marketer specified threshold for determining whether to send marketing communications. The threshold received at block 405 can be a un-subscription probability expressed as a percentage. The marketing communications can be part of a marketing campaign targeting customers who have purchased a product or service. For example, a marketer user may employ a marketing system 310 to input a threshold T for marketing communications where T represents an un-subscription probability threshold. To do so, the user may use a typology interface such as the interface 500 shown in FIG. 5. In some embodiments, tools 112-3 for executing a campaign may include a typology tool that allows a user to set threshold T for a marketing campaign.

In some embodiments, block 405 comprises receiving a selection of a typology rule option to filter marketing communications based on a default threshold T. In one such embodiment, the default threshold can be 80%. In this example, if method 400 determines that a customer has an un-subscription probability greater than 80%, marketing communications will not be sent to that customer. Conversely, if method 400 determines that another customer has an un-subscription probability less than or equal to 80%, marketing communications will be sent to this other customer.

At block 410, a set of issues and activities to be tracked is initialized. As shown, the set of issues and activities can include service-related activities and product delivery issues, such as, for example, a lack of follow-up after a customer fills out a product-related survey and late delivery of the product in the past. In an embodiment, the set of activities or issues initialized in block 410 (i.e., set 'A') can be defined and tracked by marketing system 310. In one non-limiting embodiment, a marketing system such as Adobe® Campaign® can be used to define and track activity set A. Example issues and activities in set A can include, no follow-up after a customer fills out a product-related survey; late delivery of the product to a customer; payment processing issues; issues related to particular product features; and product warranty issues.

In block 415, information is collected for page visits and social media site interaction. As shown, block 415 can comprise collecting information from customer interactions with marketer pages and social media sites for every feature 'F_i' in a set of features 'F' corresponding to marketer's product that the customer bought. For each feature F_i, block 415 can include determining if there any query related to the feature un-answered in the content of a posting made by a customer on the site of a Facebook® brand page of the product. Block 415 can also include determining if there is negative sentiment towards feature F_i in a post made by the customer on the marketer's site, an online retailer's site, or on the Facebook® brand page of the product.

Block 415 can comprise executing the real-time tracking system 316 to request and receive web tracking information from page visits and one or more social media sites 360, 370, where the information is associated with customer comments about the target product. For example, after the set of issues and activities A to be tracked has been identified in block 410, the planning tool 112-1 may communicate with the real-time tracking system 316 to provide customer sentiment towards the product, each feature F_i of the product, and set A of issues/activities being tracked.

Web tracking performed at block 415 can include sentiment as part of a web tracking rule. In this way, for every page visit by a customer, the score that would be assigned to the customer is a function of the value specified by the marketer as well as the sentiment measured. A degree of sentiment can be measured as part of block 415, where the degree is the amount of positive sentiment at a source corresponding to the content of the marketer's product web page. The following is an example of how a degree of sentiment at a web page can be calculated. First, an embodiment passes the content of the marketer's web page through a text/content analysis engine, such as, for example, Adobe® Sedona or a comparable natural language processing (NLP) engine such as the Natural Language Toolkit (NLTK).

In an embodiment, a degree of sentiment at a web page can be calculated using the following steps:
    i. Find the sentiment of keywords in K_T which are found in content R_C by passing the content R_C though a "keyword-level sentiment engine" (A keyword-level sentiment engine is capable of finding the sentiment associated with particular keyword in given content).
    ii. Then, calculate the overall sentiment of R_C towards the product and feature F_i by taking a weighted average of sentiment of keywords in K_T that are found in content R_C.

After receiving information about the product and each F_i feature of features F of the product, the real-time tracking system 316 generates and transmits a request to one or more social media sites 360, 370 for web tracking information associated with customer comments about the target product. For example, in one embodiment, the real-time tracking system 316 may generate and transmit a message to an API for a social media site 360, 370. Such requests may be formatted according to the API for the social media site, and may include information about the product, each feature F_i in the set F of features, and other information provided by the planning tool 112-1. For example, a marketer may elect to seek information about a particular demographic group, such as all female customers between the ages of 18-34. In such an embodiment, the real-time tracking system 316 may transmit a web tracking request that identifies at least the demographic information. In some embodiments, however, the real-time tracking system 316 may not identify the identified demographic information in the query, but instead may filter information received from the social media site 360, 370 based on the particular demographic information.

After requesting the information from the social media site 360, 370, the real-time tracking system 316 receives web tracking information from the page visits and/or social media sites, the information is associated with user comments about the target product. For example, in one embodiment, the real-time tracking system 316 receives one or more files comprising copies of user comments about the target product. In another embodiment, the real-time tracking system 316 receives statistical information regarding comments about the target product. For example, in the embodiment discussed above, a real-time tracking system 316 may receive statistical information about the demographic groups' comments about a target product. Some embodiments may provide sentiment information regarding the target product. In some embodiments, the real-time tracking system 316 may identify the type of information to be received, such as copies of the user comments or statistical information. Alternatively, the information received from the social media site(s) 360, 370 may include a combination of different types of information, such as copies of user comments, statistical information, sentiment information, or other types of information made available by a social media site 360, 370, such as through one or more APIs.

In additional or alternative embodiments, the web tracking at block 415 can be implemented as described in the following paragraphs.

An option can be provided to the marketer to include sentiment in a web tracking scoring rule. According to this rule, for every page visit, the score that would be assigned to the prospect is a function of the value specified by the marketer as well as the sentiment. For example, the user can be assigned a score using the following rule: Assigned Score=function (Value Specified, Degree of Sentiment at Page).

Content 'C_T' of the Page can be passed through a text/content analysis engine such as Adobe® Sedona or another Natural Language Processing (NLP) Engine, such as, for example, NLTK. POS Tagging can be performed on the content 'C_T' to generate the keywords vector 'K_T' (which represents the gist of comments posted at a webpage by keeping only the important words like nouns, proper nouns etc. and removing pronouns, articles etc.). For example, for a Samsung™ Galaxy S5 page, K_T will have keywords like {"Samsung", "camera", "display", "performance", "battery", "S-Health" . . . etc.}

In an alternate or additional embodiment, a marketer can manually provide a list of important keywords for the page. After receiving the web tracking information from the page visits and/or social media sites 360, 370, the method 400 continues to block 420.

At block 420, information is collected indicating relevance between un-subscriptions and inbound customer communications, such as, for example, an email message, a web page posting, or a survey response. As shown in FIG. 4, block 420 can include email tracking. In certain embodiments, the real-time tracking system 316 may collect inbound customer communications, such as emails, postings, comments, and survey responses. For each product feature F_i, block 420 can comprise determining sentiment towards the feature in customer emails, as well as identifying emails and other customer-originated communications related to the set A of issues/activities to be tracked. In some embodiments, at block 420, the email tracking can be performed as described below.

Block 420 can comprise email tracking as discussed in the following paragraphs. For example, according to an embodiment, for every feature F_i in the set of features F block 415 can determine if there any customer query related to feature F_i un-answered in the content of an email sent by the customer in past. Such an unanswered query can result in customer frustration and correspond to a higher un-subscription probability for the customer. Further, for each feature F_i, block 415 can determine if there is any negative sentiment of that feature in the content of an inbound email received from that customer.

The following paragraphs provide an example of how the relevance between a customer communication such as an inbound customer email and an un-subscription probability can be calculated:

a. Find the keywords K_S which represents important keywords (i.e., related to product features F) in the email i. Pass the content of that email through an entity and category detection engine.

ii. Entity Detection will find out the product corresponding to this email and theme detection will find out important keywords (features F) of this product.

iii. Determine if the entities mentioned in this email and theme of this email matches with marketer's product and/or feature F_i.

Natural Language processing can be used in example embodiments to do following: (1) An "n-gram POS (part of speech) tagger" trained on the email content can easily identify important keywords (e.g., corresponding to feature F_i) in the customer's email message.

For this, embodiments can use the 'Statistical Autotagger/summarizer' provided by Adobe® Sedona to identify keywords.

Additional or alternative embodiments can also use the Natural Language Toolkit (NLTK) part of speech (POS) tagging for the same purpose. Outlined below is an example text mining approach that embodiments can use to identify important keywords in marketer's product ad/product landing page/product email using NLTK.

Next, block 420 can convert tokenized text to lower case using "words=[w.lower( ) for w in tokens]."

Then, an embodiment can do stemming, which is a process for finding stems of the words. NLTK offers two stemmers, Porter and Lancaster. An embodiment can use both. For example, the following script can be used:

porter=nltk.PorterStemmer( )

lancaster=nltk.LancasterStemmer( )

stemedwords_first_pass=[porter.stem(t) for t in words]

stemedwords_final_pass=[lancaster.stem(t) for t in stemedwords_first_pass]

Next, an embodiment can do lemmatization, which is a process of grouping together the different inflected forms of a word so they can be analyzed as a single item. As would be understood by one skilled in the relevant art, lemmatization is an algorithmic process of determining the lemma for a given word. Since the lemmatization process may involve complex tasks such as, for example, understanding context and determining the part of speech of a word in a sentence (which can require, for example, knowledge of the grammar of a language), it can be complex to implement a lemmatizer for a new language.

In one embodiment, lemmatization can be performed as follows:

wnl=nltk.WordNetLemmatizer( )

completely_normalized_words=[wnl.lemmatize(t) for t in stemedwords_final_pass]

In additional or alternative embodiments, email tracking at block 420 can be implemented as described in the following paragraphs.

An option can be provided to a marketer to include the relevance between the context of the customer email and past un-subscriptions by other customers so that for every un-subscription, a score would be assigned to the customer is a function of the relevance between the email and communications sent by customers who have previously unsubscribed.

Content 'C_S' of the email can be passed through a text/content analysis engine like Adobe® Sedona or any other Natural Language Processing (NLP) Engine like NLTK. POS Tagging can then be performed on the content 'C_S' to generate the keywords vector 'K_S' (which represents the gist of the email by keeping only the important words like nouns, proper nouns etc. and removing pronouns, articles etc.)

When a customer clicks on the link in the email to unsubscribe or to visit marketer's product page, track the pages 'S_P' visited by the customer.

Then, find the entity 'E' corresponding to the web page pointed by the link in the email.

After email tracking information is collected at block 420, control is passed to block 425.

At block 425, an un-subscription probability for each customer is determined. As shown in FIG. 4, this determination can be based at least in part on the sentiment and data regarding tracked issues and activities. The sentiment and data can be derived from the web and email tracking performed at blocks 415 and 420, respectively. Block 425 can comprise correlating activities and issues shared by customers who have previously unsubscribed to activities and issues that a given customer has experienced. As shown, the un-subscription probability calculated at block 425 can be based on a percentage of other customers who have unsubscribed for each issue/activity. For example, as illustrated in FIG. 6, if historical data indicates that 90% of customers who have an un-answered query or question have un-subscribed from marketing communications, a customer who has the same issue (e.g., a un-answered query or question) will be assigned an un-subscription probability of 90%. Additional examples of correlating issues and activities to un-subscription probabilities are provided in FIG. 6, which is discussed below.

In some embodiments, block 425 can include determining how many customers previously unsubscribed from marketing communications. For instance, for a previous marketing communication sent to N customers, out of which U number of customers, unsubscribed from the communication, and 'R' number of customers did not unsubscribe, R=N−U. Then, for every activity A_i in set A of the tracked issues and activities initialized at block 410, block 425 determines a probability P_A_i of a customer un-subscribing from a marketing communication by: finding the number U_A_i of users in U that exhibited activity A_i; and then finding the number R_A_i of users in R that exhibited activity A_i. For tracked issues and activities such as no follow up after a survey and late delivery of a product or service, probability P_A_i can be determined using information stored in data store 114 of marketing system 310 as a result of performing block 415. For other tracked activities such as an un-answered query related to a particular feature, the content of the communications or post sent/posted by the customer can be passed through a natural language processing engine at block 420 to determine if the content mentions that specific feature.

According to an embodiment, block 425 calculates a percentage probability P_A_i as follows: P_A_i=U_A_i/ (U_A_i+R_A_i)*100. Then, for every customer U_i, block 425 determines the probability P_U_i of that customer un-subscribing. If block 430 determines that the probability P_U_i is greater than the marketer specified threshold T received at block 405, control is passed to block 435 so that this customer is excluded from the set of customers to whom marketing communications will be sent. In block 425, P_U_i can be computed as follows:

initialize P_U_i=0
    For every activity A_i in A
    If activity A_i is exhibited by user U_i $$P\_U\_i = P\_U\_i + P\_A\_i$$

If P_U_i>T (determined at block 430), pass control to block 435 to exclude customer U_i from the set of customers to whom campaign communications should be sent.

At block 430, a determination is made as to whether an un-subscription probability for a customer exceeds the threshold received at block 405. If it is determined that the un-subscription probability exceeds the threshold, control is passed to block 435 where transmission of marketing communications to the customer is disabled. Otherwise, control is passed to block 445, where a marketing communication is transmitted to the customer before passing control back to block 415 so that blocks 415-430 can be repeated.

Blocks 415-430 can be repeated as needed to update the customer's un-subscription probability based on customer activity occurring after the last decision regarding a marketing communication was made for a customer. In this way, if a customer's un-subscription probability changes due to evaluation of customer-originated communications (e.g., inbound emails), tracked activities, or tracked issues, method 400 can decide to send or filter marketing communications based on a customer's most-recent un-subscription probability.

At block 435, transmission of marketing communications to the customer is disabled. As shown in FIG. 4, the transmission is temporarily disabled while the customer's un-subscription probability exceeds the threshold. In cases where the marketing communications include email messages, block 435 can comprise temporarily removing the customer from an email list.

Then, at block 440, a sorted set of issues and activities is produced. As shown, the list is sorted by respective probabilities of unsubscribing for each tracked issue and activity, and the sorted list is provided as an output of method 400. Block 440 can include providing the sorted list as a report in a user interface of marketing system 310. In this way, the activities that have been sorted on the basis of their probabilities of un-subscribing can be provided as a the sorted list to a marketer so that the marketer can readily see the top reasons causing customers to unsubscribe. Thus, the marketer can use the list to know which issues need to be taken care of in order to prevent further un-subscriptions related to those activities. After the sorted list is produced, control is passed back to block 415 so that the customer's un-subscription probability can be recalculated to reflect any new customer communications, activities, or issues since the previous iteration of blocks 415-430. In this way, a customer may be added back to a list of customers to be sent communications after the customer's un-subscription probability falls below the threshold. For example, resolution of delivery or payment issues may improve the customer's sentiment towards the product determined in blocks 415 and 420, and result in a decrease in that customer's un-subscription probability in block 425 such that the un-subscription probability is below the threshold.

Thus, in the example of FIG. 4, an un-subscription probability exceeding a threshold results in temporarily ceasing transmission of marketing communications to the customer, and blocks 415-430 can be repeated as needed to update the customer's un-subscription probability.

Example Sentiment Engine Outputs and Interfaces

In an embodiment, keyword level sentiment analysis can be performed by a keyword level sentiment engine that provides the ability to extract keyword-level sentiment. One example sentiment engine is the AlchemyAPI, which has the capability of extracting keyword-level sentiment. For example, the Adobe® Phoenix and Sentiment Analysis Engine can be used in some embodiments. Such an engine may be configured to detect, extract, and weight sentence affect and sentiment signal using a sentiment vocabulary combined with a NLP engine. It can use as input POS and NX/VX tagged sentences, and then determine and score the positive, negative, and neutral sentiment.

FIG. 5 depicts an example user interface 500 for setting delivery parameters for marketing communications such as emails. As shown, interface 500 includes a typology tab 510 for defining a typology rule 520 for marketing communications such as emails. By default, for marketing e-mails, interface 500 enables a marketer to set the following parameters for a marketing communication: approving the subject (e.g., an email subject), approving URLs and images included in the communication, approving the URL labels displayed in the communication, approving an un-subscription link included in the communication, checking the size of proofs, checking the validity period, checking the scheduling of waves of communications (e.g., scheduling transmission of the communication to customers), and preventing transmission of the communication to customers whose probability of un-subscribing is greater than the marketer's defined threshold. In the example of FIG. 5, edit link 530 can be selected to edit a default typology rule in order to tailor communications by setting any of the above-listed parameters.

In an embodiment, a marketing system includes interface 500 so that topology rules are enhanced by providing a selectable option to the marketer to indicate that communications are not to be sent to customers whose probability of un-subscribing exceeds a marketer defined threshold.

FIG. 6 depicts a table 600 showing calculated probabilities 640 of customers unsubscribing from marketing communications based on issues 610 experienced by the customers. As shown, historical data in table 600 indicates that 90% of customers 620 and 630 who have an un-answered query or question have un-subscribed from marketing communications. In particular, the number of customers 620 with an un-answered query/question who un-subscribed (12,500 in the example of FIG. 6) represents 90% of the total number of customers who have had this issue, and the number of customers 630 with an un-answered query/question who did not unsubscribe (1,360 in the example of FIG. 6) account for only 10% of customers with this issue. Thus, if a customer who has the same issue (e.g., a un-answered query or question) is being evaluated, that customer can be assigned an un-subscription probability of 90% based on the historical data provided in FIG. 6. FIG. 6 illustrates an example un-subscription probability 640 of 76% for customers who are dissatisfied with a particular feature of a product, and another un-subscription probability 640 of 80% for customers who are dissatisfied with a another feature of the product. FIG. 6 also shows an example un-subscription probability 640 of 65% for customers who have a service-related issue. As shown, these customers have experienced late delivery of the product. In the example of FIG. 6, if an un-subscription probability threshold is set to 75%, customers who have a service-related issue (and none of the other issues 610), will be assigned an un-subscription probability of 65% and will be sent marketing communications. Similarly, customers experiencing the other issues 610 will be assigned un-subscription probabilities higher than the 65% threshold (e.g., 76%, 80%, or 90%, and as a result, these customers will not be sent marketing communications.

Embodiments use a sentiment analysis engine. One non-limiting example of such a sentiment analysis engine is Adobe® Sammy/Semantria. A sentiment analysis engine can be used in certain embodiments to determine the overall sentiment of a given piece of content. For example, FIG. 7 provides an example output of a sentiment engine.

FIG. 7 shows an example interface 700 for presenting sentiment 710 determined from a customer posting 702. FIG. 7 provides an example of a positive social media (e.g., Facebook®) post 702 by a customer who purchased a Samsung™ Note 4 along with the corresponding output of a sentiment engine. As shown in FIG. 7, a marketer user has selected keyword analysis 704, and the sentiment engine classified post 702 as negative based on analysis of keywords 706 in the post. In particular, FIG. 7 shows sentiment engine output from AlchemyAPI for detected keywords 706 in the following example customer posting:

"I brought a Samsung™ Note 4 to gift to my daughter on her birthday. I was promised that it will arrive in 48 hours but it was quite frustrating to get the delivery after 7 days, I will never buy from your site anymore."

As shown, this customer is not happy with the late delivery of the Samsung™ Note 4 by an online retailer. In this example, the set of tracked issues for the marketer include delivery issues. The customer no longer believes that he will get his ordered goods on time in future as well. The keyword level sentiment engine accurately figured this out as the sentiment 710 associated with the keyword 706 "delivery" is negative. In this example, this customer also has a negative sentiment 710 for the keyword 706 "site." As shown, interface 700 also indicates relevance values 708 for each identified keyword 706. The sentiment 710 for posting 702 in interface 700 can be used by a marketer to decide to cease sending marketing communications to the customer until the product (e.g., the purchased phone) has been delivered.

Example Process

Figure 8:
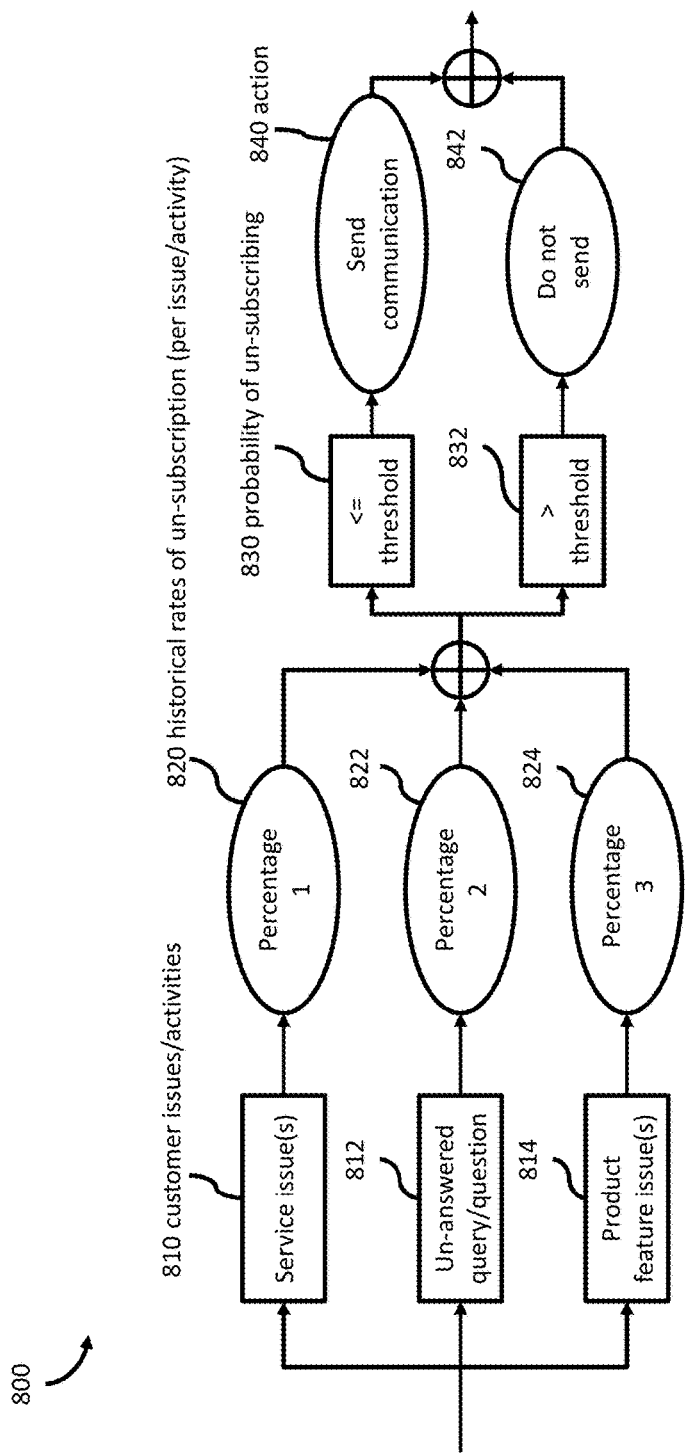
FIG. 8 show process flows for generating marketing communications, in accordance with embodiments.

FIG. 8 shows a process flow 800 for deciding whether to transmit a marketing communication according to certain embodiments. According to embodiments, the customer evaluated using process flow 800 can be a customer with an un-subscription probability as determined by method 400 described above with reference to FIG. 4. Also, when process flow 800 is used to send a marketing communication embodied as an email message, the process can use an email list of customers. In the example shown in FIG. 8, three tracked issues 810, 812, 814 have been identified. According to this embodiment, the marketing system 310 is configured to enable a marketer to identify issues 810, 812, 814 to be tracked. To determine whether or not to send a communication such as a promotional email to each member of a customer population, the marketing system 310 first determines historical un-subscription rates 820, 822, 824 corresponding to customers who had one of the tracked issues 810, 812, 814. In this embodiment, three percentages 820, 822, 824 have been calculated by the marketing system 310 based on historical data. For purposes of this example, the marketing system 310 can calculate the percentages for a population of customers of the same product.

After the marketing system 310 calculates the respective percentages 822, 822, 824 for issues 810, 812, 814, the marketing system 310 correlates the percentages to a predicted un-subscription rate for a customer being evaluated. Therefore, the marketing system 310 infers an un-subscription probability for a customer based on the historical data and a correlation between customers who have previously un-subscribed and have one or more issues in common with the customer being evaluated. The marketing system 310 then proceeds to determine if the customer has an un-subscription probability 830 that is less than or equal to the threshold. In this case, the marketing system 310 sends a communication (e.g., an email) to the customer by performing action 840. Otherwise, if the customer has an un-subscription probability 832 that is above the threshold, the marketing system 310 performs action 842 so as to prevent sending the communication. After traversing the process flow 800, the marketing system 310 has filtered a marketing communication so that it is only sent to customers having a un-subscription probability less than or equal to the threshold.

Thus, by executing the process flow 800, the marketing system 310 can evaluate each consumer (e.g., customer in an email list) to determine whether to send the marketing communication to the respective customer based on the customer's probability of un-subscribing.

In some of the embodiments discussed above, the marketing communication comprises an email communication. However, in other embodiments, other types of communications may be created and transmitted. As discussed above, in some embodiments, the marketing system 310 comprises a data store 114 that may include information regarding different customers. Some of the stored information may include preference information regarding desired and disfavored forms of communication. For example, customer profiles stored in a data store 114 may comprise information regarding the profiled customers' preferences for email communications, instant messages, Tweets®, SMS or MMS text messages, in-app messages, postal mail communications, social media messages (e.g., Facebook® status updates or private messages), etc. Embodiments according to this disclosure may send communications based on the target customer population's, or even individual targeted customers', preferences. In some embodiments, multiple different communications channels may be used simultaneously, or may reference each other. For example, in one embodiment, the marketing system 310 may generate an email message and a Facebook® message on the user's Facebook® timeline, where the email message provides a URL to Facebook® and a message to view a promotional offer available through Facebook®. Thus, the marketing system 310 may be configured to generate and transmit a wide variety of marketing communications.

Example Computer System Implementation

Figure 9:
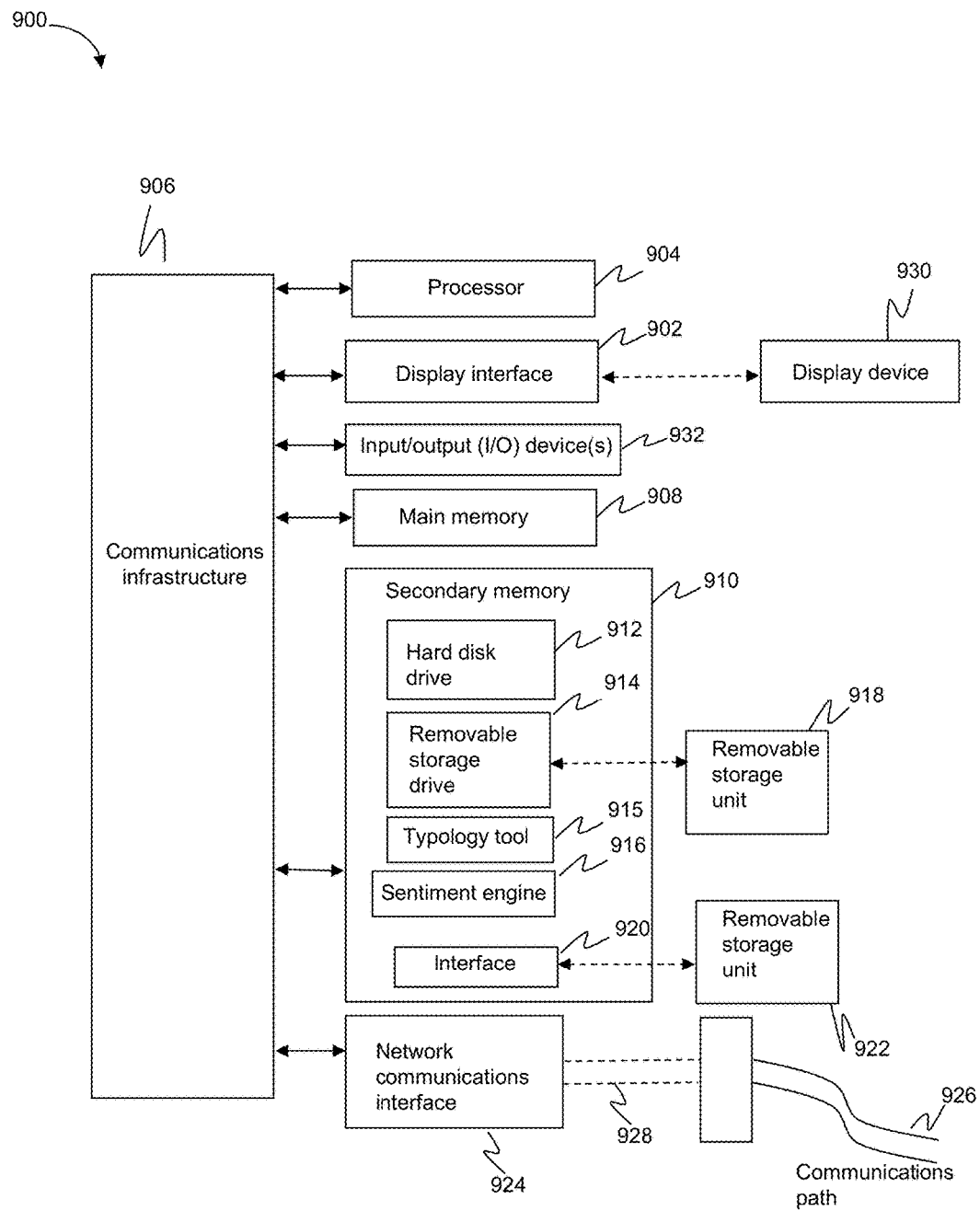
FIG. 9 is a diagram of an exemplary computer system in which embodiments of the present disclosure can be implemented.

Although exemplary embodiments have been described in terms of charging apparatuses, units, systems, and methods, it is contemplated that certain functionality described herein may be implemented in software on microprocessors, such as a microprocessor chip included in the processors of marketing systems 110 and 310 and processor of tracking system 316 shown in FIGS. 1 and 3, and computing devices such as the computer system 900 illustrated in FIG. 9. In various embodiments, one or more of the functions of the various components may be implemented in software that controls a computing device, such as computer system 900, which is described below with reference to FIG. 9.

Aspects of the present invention shown in FIGS. 1-8, or any part(s) or function(s) thereof, may be implemented using hardware, software modules, firmware, tangible computer readable media having logic or instructions stored thereon, or a combination thereof and may be implemented in one or more computer systems or other processing systems.

FIG. 9 illustrates an example computer system 900 in which embodiments of the present invention, or portions thereof, may be implemented as computer-readable instructions or code. For example, some functionality performed by the marketing systems 110 and 310 and their respective tools 112 and tracking system 316 shown in FIGS. 1-3, can be implemented in the computer system 900 using hardware, software, firmware, non-transitory computer readable media having instructions stored thereon, or a combination thereof and may be implemented in one or more computer systems or other processing systems. Hardware, software, or any combination of such may embody certain modules and components used to implement blocks in the method 400 illustrated by the flowchart of FIG. 4 discussed above. Similarly, hardware, software, or any combination of such may embody the marketing systems 110 and 310 and their respective tools 112 and tracking system 316 discussed above with reference to FIGS. 1-3.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, at least one processor device and a memory may be used to implement the above-described embodiments. A processor device may be a single processor, a plurality of processors, or combinations thereof. Processor devices may have one or more processor "cores."

Various embodiments of the invention are described in terms of this example computer system 900. After reading this description, it will become apparent to a person skilled in the relevant art how to implement the invention using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 904 may be a special purpose processor device. As will be appreciated by persons skilled in the relevant art, processor device 904 may also be a single processor in a multi-core/multiprocessor system, such system operating alone, or in a cluster of computing devices operating in a cluster or server farm. Processor device 904 is connected to a communication infrastructure 906, for example, a bus, message queue, network, or multi-core message-passing scheme. In certain embodiments, one or more processors of marketing systems 110 and 310 and their respective tools 112 and tracking system 316 described above with reference to FIGS. 1-3 can be embodied as the processor device 904 shown in FIG. 9.

Computer system 900 also includes a main memory 908, for example, random access memory (RAM), and may also include a secondary memory 910. Secondary memory 910 may include, for example, a hard disk drive 912, removable storage drive 914. Removable storage drive 914 may comprise a floppy disk drive, a magnetic tape drive, an optical disk drive, a flash memory, or the like. In non-limiting embodiments, one or more of the memories of marketing systems 110 and 310 and their respective tools 112 and tracking system 316 described above with reference to FIGS. 1-3 can be embodied as the main memory 908 shown in FIG. 9.

The removable storage drive 914 reads from and/or writes to a removable storage unit 918 in a known manner. Removable storage unit 918 may comprise a floppy disk, magnetic tape, optical disk, etc. which is read by and written to by removable storage drive 914. As will be appreciated by persons skilled in the relevant art, removable storage unit 918 includes a non-transitory computer readable storage medium having stored therein computer software and/or data.

In alternative implementations, secondary memory 910 may include other similar means for allowing computer programs or other instructions to be loaded into computer system 900. Such means may include, for example, a removable storage unit 922 and an interface 920. Examples of such means may include a program cartridge and cartridge interface (such as that found in video game devices), a removable memory chip (such as an EPROM, or EEPROM) and associated socket, and other removable storage units 922 and interfaces 920 which allow software and data to be transferred from the removable storage unit 922 to computer system 900. In non-limiting embodiments, one or more of the memories of marketing systems 110 and 310 and their respective tools 112 and tracking system 316 described above with reference to FIGS. 1-3 can be embodied as the main memory 908 shown in FIG. 9. In the non-limiting example shown in FIG. 9, secondary memory 910 includes a typology tool 915 and a sentiment engine 916. Typology tool 915 and sentiment engine 916 can be implemented as computer programs stored in secondary memory 910.

According to one example, typology tool 915 can be a typology tool included in a marketing system, such as, for example, Adobe® Campaign®. By using typology tool 915, a marketer can filter out users that marketing communications (e.g., email messages) should not be sent to. Typology tool 915 can be used to create and modify typology rules, and can include a user interface, such as the example interface shown in FIG. 4, discussed above. For instance, typology tool 915 can be used to add or edit a typological rule that indicates that a marketing communication should not be sent to users whose probability of un-subscription is above a certain threshold value. In one example, typology tool 915 can be used to create a typology rule stipulating that marketing communications are not to be sent to users with a greater than 80 percent probability of un-subscription. Typology tool 915 can provide interface 500 as shown in the example of FIG. 5, discussed above.

Sentiment engine 916 can be a keyword-level sentiment analysis engine that processes provided content in order to determine user sentiment of a product or product feature of interest (e.g., a camera). Sentiment engine 916 can determine sentiment, positive and negative, of multiple product features based on keyword analysis of content such as, for example, social media postings and communications sent from users to product suppliers or marketers. Sentiment engine 916 can provide output of keyword-level sentiment analysis as shown in the example of FIG. 7, discussed above.

Computer system 900 may also include a communications interface 924. Communications interface 924 allows software and data to be transferred between computer system 900 and external devices. Communications interface 924 may include a modem, a network interface (such as an Ethernet card), a communications port, a PCMCIA slot and card, or the like. Software and data transferred via communications interface 924 may be in the form of signals, which may be electronic, electromagnetic, optical, or other signals capable of being received by communications interface 924. These signals may be provided to communications interface 924 via a communications path 926. Communications path 926 carries signals and may be implemented using wire or cable, fiber optics, a phone line, a cellular phone link, an RF link or other communications channels.

As used herein, the terms "computer readable medium" and "non-transitory computer readable medium" are used to generally refer to media such as memories, such as main memory 908 and secondary memory 910, which can be memory semiconductors (e.g., DRAMs, etc.). Computer readable medium and non-transitory computer readable medium can also refer to removable storage unit 918, removable storage unit 922, and a hard disk installed in hard disk drive 912. Signals carried over communications path 926 can also embody the logic described herein. These computer program products are means for providing software to computer system 900.

Computer programs (also called computer control logic) are stored in main memory 908 and/or secondary memory 910. Computer programs may also be received via communications interface 924. Such computer programs, when executed, enable computer system 900 to implement the present invention as discussed herein. In particular, the computer programs, when executed, enable processor device 904 to implement the processes of the present invention, such as the blocks in method 400 illustrated by the flowchart of FIG. 4, discussed above. Accordingly, such computer programs represent controllers of the computer system 900. Where the invention is implemented using software, the software may be stored in a computer program product and loaded into computer system 900 using removable storage drive 914, interface 920, and hard disk drive 912, or communications interface 924.

In an embodiment, the display devices used to display interfaces and output shown in FIGS. 5-7, may be a computer display 930 shown in FIG. 9. The computer display 930 of computer system 900 can be implemented as a touch sensitive display (e.g., a touch screen). Similarly, the interfaces and analysis results depicted in FIGS. 5-7 may be rendered using the display interface 902 shown in FIG. 9.

Embodiments of the invention also may be directed to computer program products comprising software stored on any computer useable medium. Such software, when executed in one or more data processing device, causes a data processing device(s) to operate as described herein. Embodiments of the invention employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.), and communication mediums (e.g., wired and wireless communications networks, local area networks, wide area networks, intranets, etc.).

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system into a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:

1. A method of preventing an electronic marketing communication from being transmitted to a user device, the method comprising:

receiving, by a processing device, an electronic marketing communication to be transmitted to a plurality of user devices that include the user device; and preventing, by the processing device, an electronic message server from transmitting the electronic marketing communication to the user device by performing operations comprising:

applying a natural language processing engine to a web page and thereby identifying one or more features of a product described in the web page that are to be referenced in the electronic marketing communication, accessing, from a memory device, user content included in or generated by one or more of (i) an electronic interaction by one or more user devices, which are associated with a user, with a web page associated with the product and (ii) a user communication transmitted by the one or more user devices, applying the natural language processing engine to the user content and thereby identifying, in the user content, feature content referring to the one or more features, computing a degree of sentiment by applying a sentiment engine to the feature content, calculating an un-subscription score for the user associated with the one or more user devices based at least in part on the degree of sentiment, comparing the calculated un-subscription score with a threshold un-subscription score, in response to determining, based on the comparing, that the calculated un-subscription score is above the threshold un-subscription score, updating a set of permissions such that the one or more user devices are blocked from receiving the electronic marketing communication, removing, based on the updated set of permissions, a network address associated with the one or more user devices from a list of addresses used for a transmission of the electronic marketing communication, and performing the transmission while excluding the user device when sending the electronic marketing communication to users on a subscription list.

2. The method of claim 1, wherein the users on the subscription list are customers who have purchased a product.

3. The method of claim 1, further comprising:

accessing, from the memory device, additional user content included in or generated by one or more of (i) an additional electronic interaction by one or more additional user devices, which are associated with an additional user, with the web page associated with the product and (ii) an additional user communication transmitted by the one or more additional user devices, applying the natural language processing engine to the additional user content and thereby identifying, in the additional user content, additional feature content referring to the one or more features, computing an additional degree of sentiment by applying the sentiment engine to the additional feature content, calculating an additional un-subscription score for the additional user associated with the one or more additional user devices based at least in part on the additional degree of sentiment;

comparing the additional un-subscription score with the threshold un-subscription score, in response to determining that the additional un-subscription score is less than or equal to the threshold un-subscription score, including the one or more additional user devices in the transmission of the electronic marketing communication to the users on the subscription list.

4. The method of claim 1, further comprising, prior to the calculating:

receiving one or more typology rules for filtering marketing communications, the one or more typology rules including the threshold un-subscription score.

5. The method of claim 1, further comprising, prior to the calculating:

initializing a set of user activities to be tracked and compared to activities of users who previously un-subscribed from the subscription list, the set of user activities including interactions with the web page and electronic communications initiated by the users.

6. The method of claim 1, wherein the user communication from the user is one or more of an email message, an instant message, a text message, a posting on a web page associated with a product, and a posting on a social media page.

7. The method of claim 1, wherein the web page is associated with the product, and wherein the electronic interaction by the user with the web page is one or more of a completion of a product survey, a request for a demonstration of the product, a download associated with the product, and submission of a query regarding the product.

8. The method of claim 1, wherein the electronic marketing communication is one or more of an email message, an instant message, a text message, an in-app message, a message on a web page associated with a product, and a posting on a social media page.

9. A system comprising:

a processing device;

a real-time data tracking system configured to collect data from data sources for use by a marketing system;

a sentiment engine configured to determine sentiments of user web page interactions and electronic user communications based on electronic interactions by one or more user devices, which are associated with a user, and to provide the sentiments to the real-time data tracking system; and a non-transitory computer-readable medium communicatively coupled to the processing device, wherein the processing device is configured to prevent an electronic marketing communication from being transmitted to a user device by performing operations comprising:

receiving an electronic marketing communication to be transmitted to a plurality of user devices that include the user device; and preventing an electronic message server from transmitting the electronic marketing communication to the user device by performing operations comprising:

applying a natural language processing engine to a web page and thereby identifying one or more features of a product described in the web page that are to be referenced in the electronic marketing communication, accessing, from a memory device, user content included in or generated by one or more of (i) an electronic interaction by one or more user devices, which are associated with the user, with a web page associated with the product and (ii) a user communication transmitted by the one or more user devices, applying the natural language processing engine to the user content and thereby identifying, in the user content, feature content referring to the one or more features, computing a degree of sentiment by applying a sentiment engine to the feature content, calculating an un-subscription score for the user associated with the one or more user devices based at least in part on the degree of sentiment, comparing the calculated un-subscription score with a threshold un-subscription score, in response to determining, based on the comparing, that the calculated un-subscription score is above the threshold un-subscription score, updating a set of permissions such that the one or more user devices are blocked from receiving the electronic marketing communications, removing, based on the updated set of permissions, a network address associated with the one or more user devices from a list of addresses used for a transmission of the electronic marketing communication, and performing the transmission while excluding the user when sending electronic marketing communications to users on a subscription list.

10. The system of claim 9, wherein the un-subscription score is an un-subscription probability, and wherein the threshold un-subscription score is a threshold un-subscription probability, wherein calculating the un-subscription score comprises:

adjusting the un-subscription probability for the user based at least in part on a correlation between other users who previously un-subscribed from marketing communications and tracked activities of the user.

11. The system of claim 10, wherein the threshold un-subscription probability has a default value of 80%.

12. The system of claim 9, wherein the electronic marketing communication includes or more of an email message, an instant message, a text message, an in-app message, a message on a web page associated with a product, and a posting on a social media page.

13. The system of claim 9, wherein the users on the subscription list are customers who have purchased one or more of a product, a service associated with the product, and an accessory associated with the product.

14. A non-transitory computer-readable medium on which program code is stored, wherein the program code, when executed by one or more processing devices, causes the one or more processing devices to perform operations comprising:

receiving an electronic marketing communication to be transmitted to a plurality of user devices that include the user device; and preventing an electronic message server from transmitting the electronic marketing communication to the user device by performing operations comprising:

applying a natural language processing engine to a web page and thereby identifying one or more features of a product described in the web page that are to be referenced in the electronic marketing communication, accessing, from a memory device, user content included in or generated by one or more of (i) an electronic interaction by one or more user devices, which are associated with a user, with a web page associated with the product and (ii) a user communication transmitted by the one or more user devices, applying the natural language processing engine to the user content and thereby identifying, in the user content, feature content referring to the one or more features, computing a degree of sentiment by applying a sentiment engine to the feature content, calculating an un-subscription score for the user associated with the one or more user devices based at least in part on the degree of sentiment, comparing the calculated un-subscription score with a threshold un-subscription score, in response to determining, based on the comparing, that the calculated un-subscription score is above the threshold un-subscription score, updating a set of permissions such that the one or more user devices are blocked from receiving the electronic marketing communication, removing, based on the updated set of permissions, a network address associated with the one or more user devices from a list of addresses used for a transmission of the electronic marketing communication, and performing the transmission while excluding the user device when sending the electronic marketing communication to users on a subscription list.

15. The non-transitory computer-readable medium of claim 14, further comprising:

accessing, from the memory device, additional user content included in or generated by one or more of (i) an additional electronic interaction by one or more additional user devices, which are associated with an additional user, with the web page associated with the product and (ii) an additional user communication transmitted by the one or more additional user devices, applying the natural language processing engine to the additional user content and thereby identifying, in the additional user content, additional feature content referring to the one or more features, computing an additional degree of sentiment by applying the sentiment engine to the additional feature content, calculating an additional un-subscription score for the additional user associated with the one or more additional user devices based at least in part on the additional degree of sentiment;

comparing the additional un-subscription score with the threshold un-subscription score, in response to determining that the additional un-subscription score is less than or equal to the threshold un-subscription score, including the one or more additional user devices in the transmission of the electronic marketing communication to the users on the subscription list.

16. The non-transitory computer-readable medium of claim 14, further comprising, prior to the calculating:

receiving one or more typology rules for filtering marketing communications, the one or more typology rules including the threshold un-subscription score.

17. The non-transitory computer-readable medium of claim 14, further comprising, prior to the calculating:

initializing a set of user activities to be tracked and compared to activities of users who previously un-subscribed from the subscription list, the set of user activities including interactions with the web page and electronic communications initiated by the users.

18. The non-transitory computer-readable medium of claim 14, wherein the user communication from the user is one or more of an email message, an instant message, a text message, a posting on a web page associated with a product, and a posting on a social media page.

19. The non-transitory computer-readable medium of claim 14, wherein the web page is associated with the product, and wherein the electronic interaction by the user with the web page is one or more of a completion of a product survey, a request for a demonstration of the product, a download associated with the product, and submission of a query regarding the product.

20. The non-transitory computer-readable medium of claim 14, wherein the electronic marketing communication is one or more of an email message, an instant message, a text message, an in-app message, a message on a web page associated with a product, and a posting on a social media page.

\* \* \* \* \*